US005692206A

United States Patent [19]

Shirley et al.

[11] Patent Number: 5,692,206
[45] Date of Patent: Nov. 25, 1997

[54] METHOD AND APPARATUS FOR AUTOMATING THE GENERATION OF A LEGAL DOCUMENT

[75] Inventors: Robert Bryce Shirley, Irvine; Albert Michael Castro, Mission Viejo, both of Calif.

[73] Assignee: Taco Bell Corporation, Irvine, Calif.

[21] Appl. No.: 347,644

[22] Filed: Nov. 30, 1994

[51] Int. Cl.$^6$ .................................................. G06F 17/21
[52] U.S. Cl. ...................... 395/793; 395/768; 395/902; 395/919; 395/338; 395/767; 395/769; 395/762; 395/773; 395/776; 395/777; 395/925; 395/933
[58] Field of Search ...................... 364/419.1, 419.02, 364/419.14; 395/157, 338, 793, 767, 768, 769, 902, 919, 762, 773, 776, 777, 925, 933

[56] References Cited

U.S. PATENT DOCUMENTS

| | | |
|---|---|---|
| 4,346,442 | 8/1982 | Musmanno . |
| 4,752,877 | 6/1988 | Roberts et al. . |
| 4,800,485 | 1/1989 | Ackroff et al. . |
| 4,809,220 | 2/1989 | Carlson ................................ 364/900 |
| 4,831,526 | 5/1989 | Luchs et al. . |
| 4,858,171 | 8/1989 | Furusawa ............................. 364/900 |
| 4,876,648 | 10/1989 | Lloyd . |
| 5,006,998 | 4/1991 | Yasunobu et al. ..................... 364/513 |
| 5,025,396 | 6/1991 | Parks et al. .......................... 364/518 |
| 5,043,891 | 8/1991 | Goldstein et al. ..................... 364/419 |
| 5,140,650 | 8/1992 | Casey et al. .......................... 382/61 |
| 5,142,619 | 8/1992 | Webster, III ......................... 395/157 |
| 5,179,718 | 1/1993 | MacPhail ............................. 395/80 D |
| 5,267,155 | 11/1993 | Buchanan et al. ..................... 364/419.14 |
| 5,272,623 | 12/1993 | Grubb et al. . |
| 5,291,399 | 3/1994 | Chaco ................................. 364/413.02 |
| 5,313,394 | 5/1994 | Clapp ................................. 364/419.1 |
| 5,444,615 | 8/1995 | Bennett et al. ....................... 395/208 |
| 5,446,653 | 8/1995 | Miller et al. ........................ 395/204 |
| 5,526,520 | 6/1996 | Krause ............................... 395/615 |
| 5,581,684 | 12/1996 | Dudzik et al. ....................... 395/338 |
| 5,603,025 | 2/1997 | Tabb et al. .......................... 395/602 |

OTHER PUBLICATIONS

"ABF: A system for automating document compliance" by James Sprowl et al. National Computer Conference; 1987 pp. 711–717.

*Primary Examiner*—Robert A. Weinhardt
*Assistant Examiner*—Gita D. Shingala
*Attorney, Agent, or Firm*—Knobbe, Martens, Olson & Bear

[57] ABSTRACT

The contract generation system of the present invention automates the generation of various legal documents related to a negotiated agreement. The contract generation system provides various standard documents that can be customized for each deal. The contract generation system also provides a database for containing general contract data, which is linked to the contract documents containing the textual provisions of the contract. The contract generation system also includes alternate provisions that can replace provisions in the standard documents, as well as supplemental and additional provisions that can be added to the standard documents. The contract generation system also allows for the contract documents to be manually edited to further customize the documents for a specific deal. The contract generation system also contains a legal advisor for providing corporate-supplied information and guidance to individual negotiators, to assist the negotiators in reaching and documenting an agreement with an opposing party. The contract generation system also provides revision maintenance, redlining, printing, and electronic mail capabilities.

16 Claims, 17 Drawing Sheets

METHOD AND APPARATUS FOR AUTOMATING THE GENERATION OF A LEGAL DOCUMENT

BACKGROUND OF THE INVENTION

1. Field of the Invention

The present invention relates to a method and apparatus for automating the generation of a legal document. In particular, the present invention relates to the automated generation of a generally customized contract that includes company standard clauses.

2. Description of the Related Art

Two previously issued United States patents disclose the use of a computer system for assisting in the generation of a document. However, these systems have only limited capabilities.

U.S. Pat. No. 5,272,623, issued to Grubb, et al., on Dec. 21, 1993, discloses a software programming method for forming government contracting documents. In the method of the Grubb, et al., patent, a menu-driven computer system receives operator input data, such as purchase request data, vendor data, etc. Next, the operator selects one or more categories from a database and then answers one or more logic questions. The computer system performs a logic analysis on the input data, the selections, and the answers using a series of logic tables. The computer system subsequently generates a tailored Government contracting document including one or more selected Government Agency Regulation clauses, where each clause is located in a proper section of the document.

U.S. Pat. No. 4,831,526, issued to Luchs, et al., on May 16, 1989, discloses a computerized insurance premium quote request and policy issuance system. In the system of the Luchs, et al., patent, a menu-driven computer system receives operator input data, such as information about the risk to be insured and about the client. The computer system provides the operator with relevant insurance premium quotations, as determined from the input data. If the client agrees to purchase the insurance, the computer system proceeds to automatically generate a customized insurance contract, based on various factors, such as the risks to be insured, the client data, and particular aspects of state law governing the contract. The computer system merges the input data into the contract and prints the resulting insurance contract.

The computer systems from the Grubb, et al., patent and the Luchs, et al., patent do not allow sufficient operator flexibility to be useful in a number of situations. In the system of the Grubb, et al., patent, the terms of the contracting document are completely determined by the input data, the categories selected, the answers to the logic questions, and the content of the logic tables. The operator has no direct control over which Government Agency Regulation clauses are inserted in the resulting contracting document. Similarly, in the system of the Luchs, et al., patent, the clauses of the insurance contract are automatically determined from information such as the risks to be insured and client data. Again, an operator of the program has no direct control over the clauses that are to be inserted into the policy.

SUMMARY OF THE INVENTION

Although the previously described computer systems may be useful in government contracting applications and insurance contracting applications, the systems are too rigid for many other applications. For example, in some applications, a user of the contract generation program may require more flexibility in defining the terms of a particular contract, to allow for the negotiation of contract terms with another party. The present invention has several features that provide the operator with sufficient flexibility to be useful in a greater variety of situations. The present invention also has various other advantages over the above-described systems.

The present invention is directed to a contract generation system which automates the generation of a contract and of various legal documents related to the negotiated contract. The contract generation system provides various standard contracts that can be customized with alternative, supplemental, and additional provisions that can be utilized with the standard contract document. The present invention also provides auxiliary documents which are related to the negotiated contract documents such as payment schedules, due date schedules, termination dates, and other tasks which accompany the execution of a contract. Advantageously, the contract generation system of the present invention also has a legal advisor which provides information to the user in negotiating the contract. Preferably, the contract generation system also provides revision maintenance, redlining, printing, and electronic mail capabilities.

One aspect of the present invention involves a contract authoring system implemented on a computer. The contract authoring system has a contract authoring unit responsive to requests from a user to manage the creation of a contract document. The authoring system also has a legal advisor coupled to the contract authoring unit. The legal advisor has information for display to the user that sets forth explanations or definitions. An auxiliary document unit is coupled to the contract authoring unit and is responsive to requests from the user to create documents associated with the contract document. The system also has provision libraries having at least a plurality of provisions defined for contract documents.

In one embodiment, the the contract authoring system further comprises a new contract folder which stores a contract document during authoring. In one embodiment, the contract authoring also has a plurality of standard contract documents stored on a computer storage media of the computer. The standard contract documents comprise at least one standard contract having a plurality of standard provisions. Advantageously, the contract authoring system further comprises a revision maintenance unit responsive to a request by the user to create a new revision of the contract document having general provisions to save the existing general provisions document under a revision designator and create a new general provisions document under another revision designator.

The contract authoring system can also include a redline unit responsive to a request by the user to compare first and second contract documents and indicate the variations between the first and second contract documents.

Advantageously, the contract authoring system also has a print unit responsive to a print request from the user to print the contract document in a format selected by the user. In one embodiment, the contract authoring system also has an E-mail control unit responsive to requests from the user to establish an E-mail connection and forward the contract document to another E-mail location.

DETAILED DESCRIPTION OF THE PREFERRED EMBODIMENT

Figure 1A:
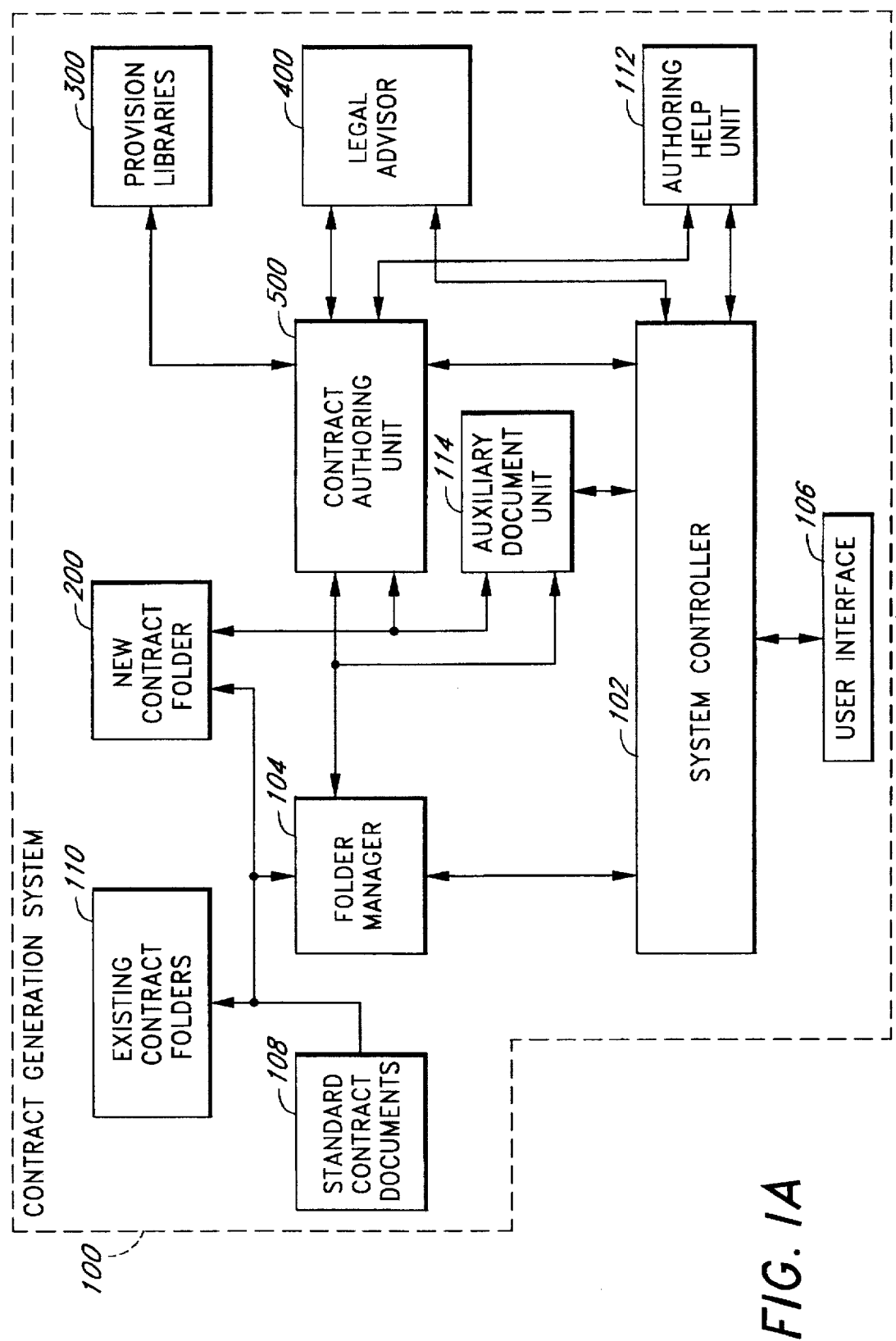
FIGS. 1A and 1B illustrate a functional block diagram of a contract generation system of the present invention.

The contract generation system 100 of the present invention depicted in FIG. 1A is preferably implemented with a conventional personal computer system comprising a personal computer, a printer 105, and a pointing device 107. As depicted in FIG. 1C, the personal computer also preferably comprises a video monitor display 109, a central processing unit (CPU) 111, a keyboard 113, a system memory 115, and one or more mass storage devices 117. In the preferred embodiment, the personal computer comprises an IBM-compatible computer, the system memory 115 comprises one or more random access memory (RAM) components, the storage devices 117 comprise a hard disk drive and one or more floppy disk drives, and the pointing device comprises a mouse. In the preferred embodiment, the storage devices 117 and the system memory 115 contain various computer programs that implement the contract generation system 100.

A preferred embodiment of the contract generation system 100 (FIG. 1A) comprises a Contract Authoring System (CAS) program, Microsoft® Windows198 and Microsoft® Word for Windows™. The CAS program is executed initially to begin the contract generation system 100. The CAS program uses conventional Dynamic Data Exchange (DDE) as the standard protocol for allowing two computer programs to communicate and exchange data with one another. The CAS program also uses the DDE to load one or more files into system memory 115. The CAS program also accesses a Dynamic Link Library (DLL), an industry standard protocol, to load data into system memory 115. The data loaded into memory is preferably related to a particular type of contract that is to be generated.

The CAS program accesses various standard macros and custom macros in Microsoft® Word to implement the functions of the contract generation system 100. Also, the menus and toolbox functions of Microsoft® Word are modified to allow user selection of functions that are specific to the contract generation system 100. A person of skill in the art can refer to documentation describing the operation of Microsoft® Word, as well as descriptions of DDE and the DLL, to implement the concepts of the present invention. In addition, the concepts of the present invention can be implemented in various other computer systems, using various other computer programs.

The contract generation system 100 preferably comprises a number of functional units, as described in greater detail below relative to FIGS. 1A and 1B. The functional units of the contract generation system 100 may comprise, for example, software routines in the CAS program, Microsoft® Windows™ and Microsoft® Word for Windows™. The different functional units in the contract generation system 100 may be coupled together in any of various conventional methods. For example, a first functional unit may pass data to a second functional unit in the form of a variable.

Figure 1B:
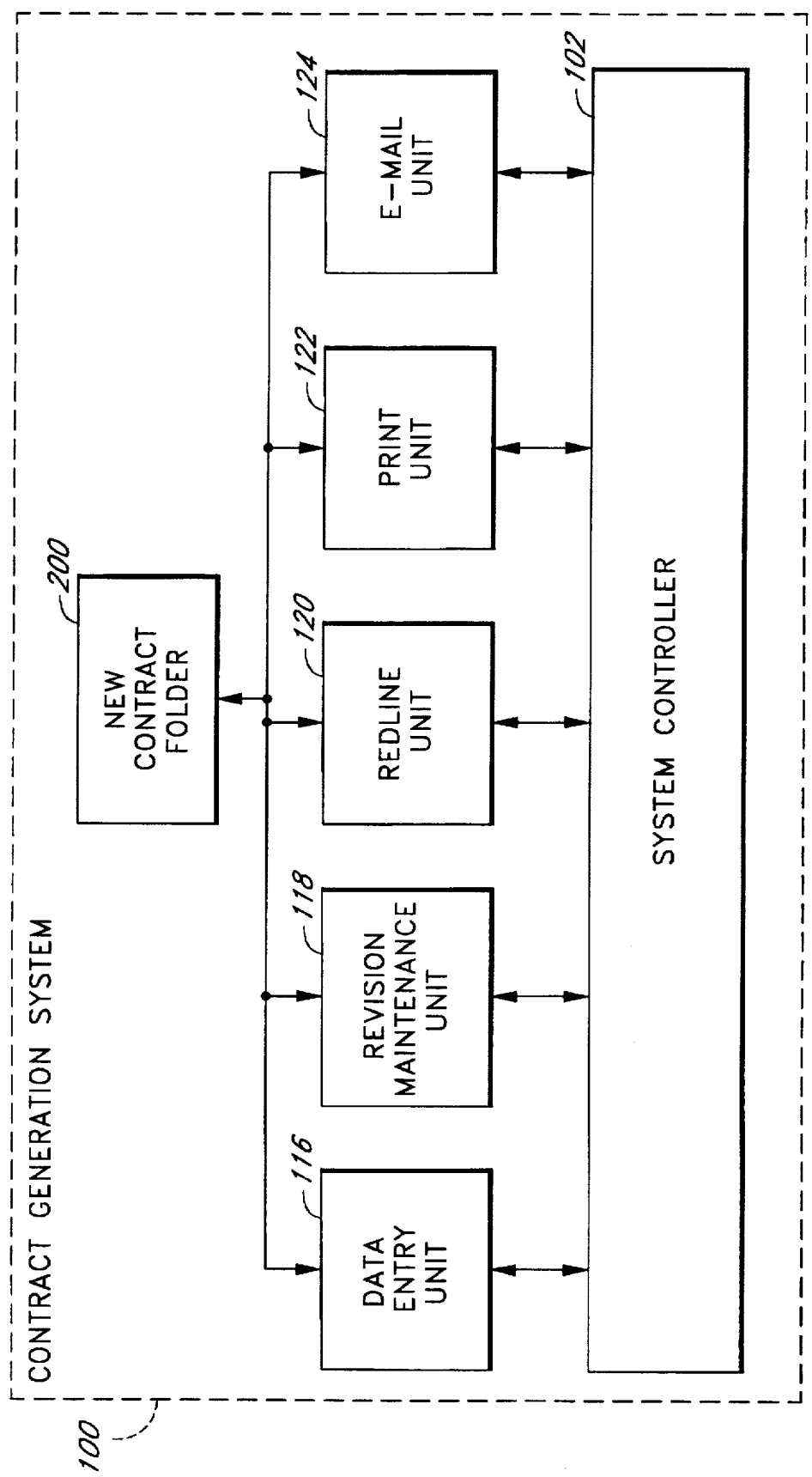
Figure 1C:
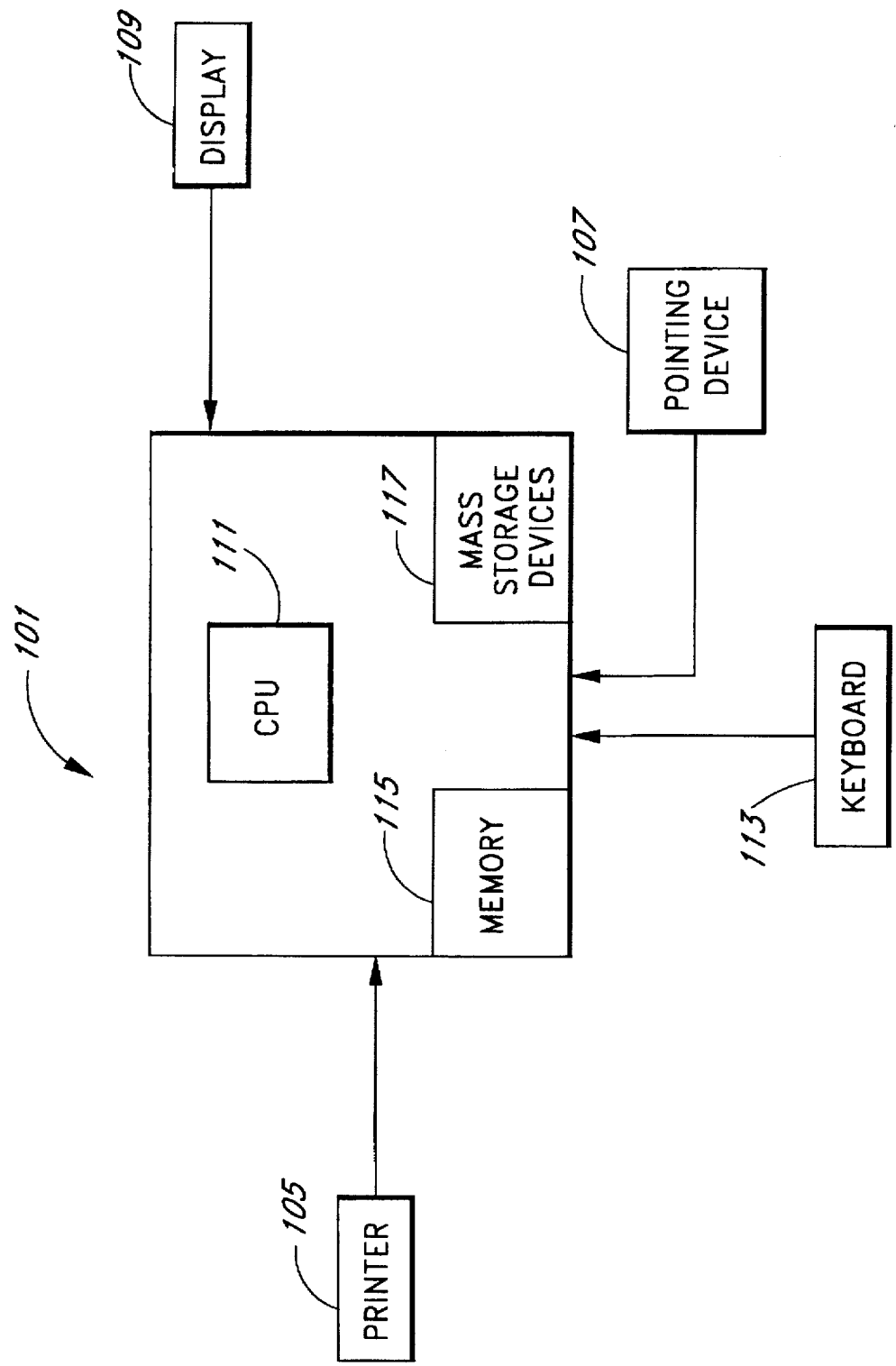
FIG. 1C illustrates a personal computer for implementation of the present invention.

FIGS. 1A and 1B illustrate a software functional block diagram of the contract generation system 100 of the present invention. As illustrated in FIG. 1A, the contract generation system 100 comprises a system controller 102, a folder manager 104, a user interface 106, one or more standard contract documents 108, one or more existing contract folders 110 one of which is a new contract folder 200, an authoring help unit 112, an auxiliary document unit 114, one or more provision libraries 300, a legal advisor 400, and a contract authoring unit 500. As illustrated in FIG. 1B, the contract generation system 100 further comprises a data entry unit 116, a revision maintenance unit 118, a redline unit 120, a print unit 122, and an E-Mail unit 124. FIG. 1B also illustrates the system controller 102 and the new contract folder 200 of FIG. 1A.

As illustrated in FIG. 1A, the user interface 106 is coupled to the system controller 102. The system controller 102 is coupled to the folder manager 104, the auxiliary document unit 114, the contract authoring unit 500, the legal advisor 400, and the authoring help unit 112. The authoring help unit 112 is coupled to the contract authoring unit 500. The legal advisor 400 is also coupled to the contract authoring unit 500. The auxiliary document unit 114 is coupled to the new contract folder 200, the contract authoring unit 500, and the folder manager 104. The contract authoring unit 500 is also coupled to the provision libraries 300, the new contract folder 200, and the folder manager 104. The folder manager 104 is coupled to the standard contract documents 108, the existing contract folders 110, and the new contract folder 200. The standard contract documents 108 are also coupled to the existing contract folders 110, and the new contract folder 200. The existing contract folders 110 are also coupled to the new contract folder 200.

As illustrated in FIG. 1B, the system controller 102 is further coupled to the data entry unit 116, the revision maintenance unit 118, the redline unit 120, the print unit 122, and the E-Mail unit 124. Also, the new contract folder 200 is further coupled to the data entry unit 116, the revision maintenance unit 118, the redline unit 120, the print unit 122, and the E-Mail unit 124.

Figure 2:
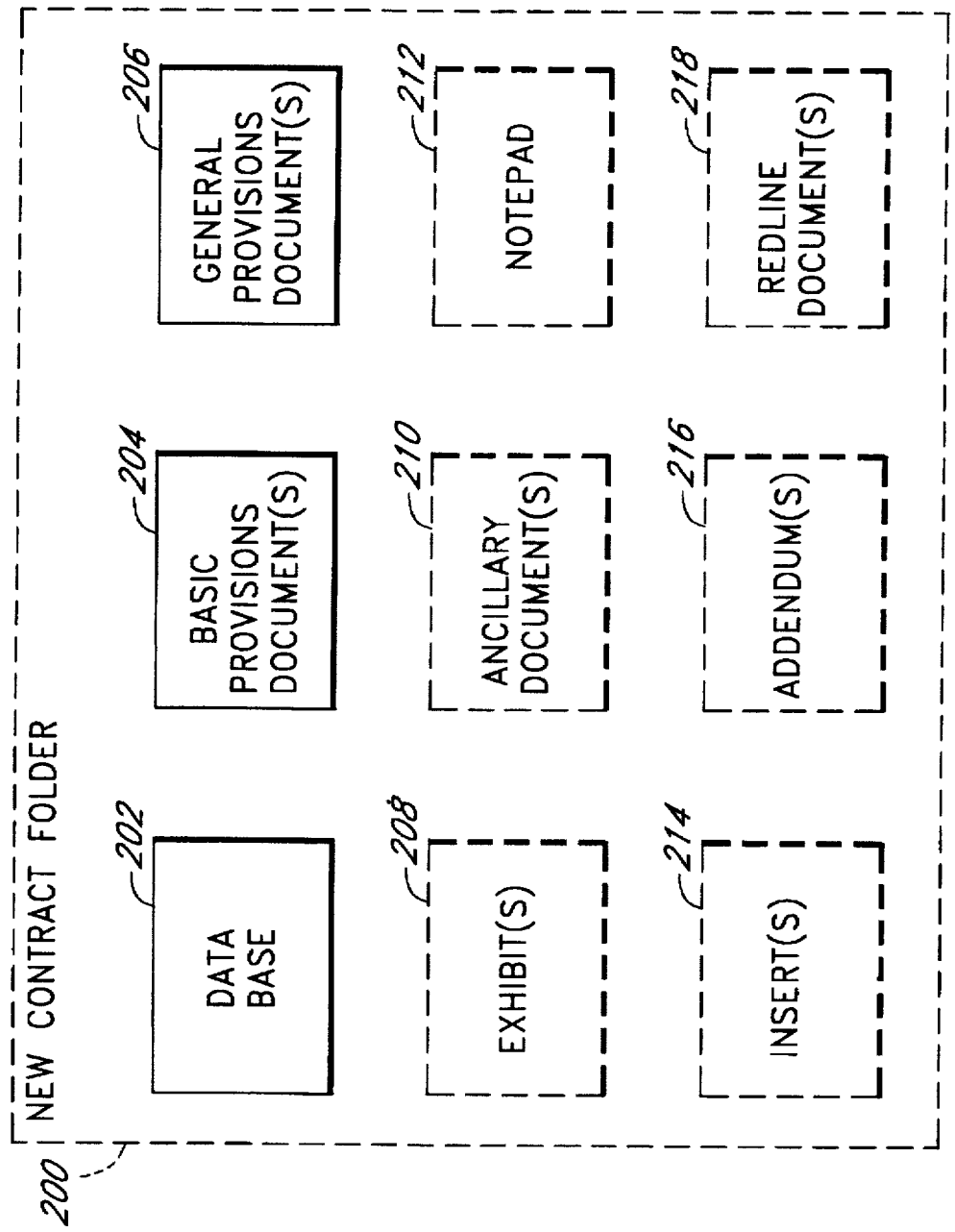
FIG. 2 illustrates a functional block diagram of the new contract folder of FIGS. 1A and 1B.

FIG. 2 illustrates a functional block diagram of the new contract folder 200 of FIGS. 1A and 1B. Each of the existing contract folders 110 has the same general structure as the new contract folder 200. As illustrated in FIG. 2, the new contract folder 200 may comprise a database 202, one basic provisions document 204, one general provisions document 206, one or more exhibits 208, one or more ancillary documents 210, a note pad 212, one or more inserts 214, one or more addendums 216, and one or more redline documents 218. The new contract folder 200 and the existing contract folders 110 may contain only a subset of the functional elements illustrated in FIG. 2. For example, many of the existing contract folders 110 may not have any inserts 214 or addendums 216.

Figure 3:
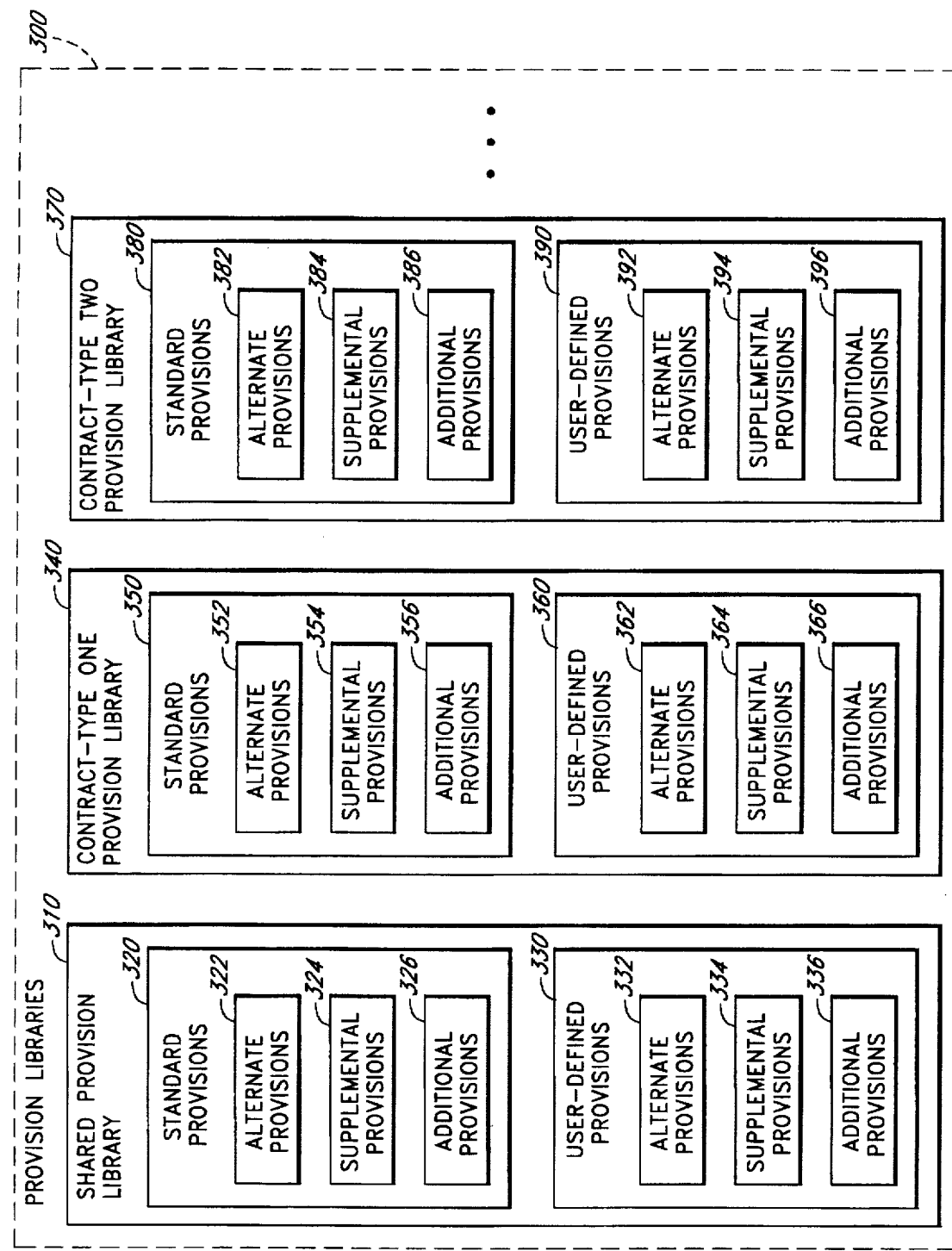
FIG. 3 illustrates a functional block diagram of the provision libraries of FIG. 1A.

FIG. 3 illustrates a functional block diagram of the provision libraries 300 of FIG. 1A. The provision libraries 300 comprise a shared provision library 310 and a number of contract-type provision libraries. FIG. 3 illustrates a contract-type one-provision library 340 and a contract-type two-provision library 370. The number of contract-type provision libraries in a particular embodiment is preferably equal to the number of types of contracts that can be generated by the contract generation system 100.

The shared provision library 310 comprises a set of standard provisions 320 and a set of user defined provisions 330. The standard provisions 320 comprise one or more alternate provisions 322, one or more supplemental provisions 324, and one or more additional provisions 326. The user defined provisions 330 comprise one or more alternate provisions 332, one or more supplemental provisions 334, and one or more additional provisions 336.

The contract-type one-provision library 340 comprises a set of standard provisions 350 and a set of user defined provisions 360. The standard provisions 350 comprise one or more alternate provisions 352, one or more supplemental provisions 354, and one or more additional provisions 356. The user defined provisions 360 comprise one or more alternate provisions 362, one or more supplemental provisions 364, and one or more additional provisions 366.

The contract-type two-provision library 370 comprises a set of standard provisions 380 and a set of user defined provisions 390. The standard provisions 380 comprise one or more alternate provisions 382, one or more supplemental provisions 384, and one or more additional provisions 386. The user defined provisions 390 comprise one or more alternate provisions 392, one or more supplemental provisions 394, and one or more additional provisions 396.

Figure 4:
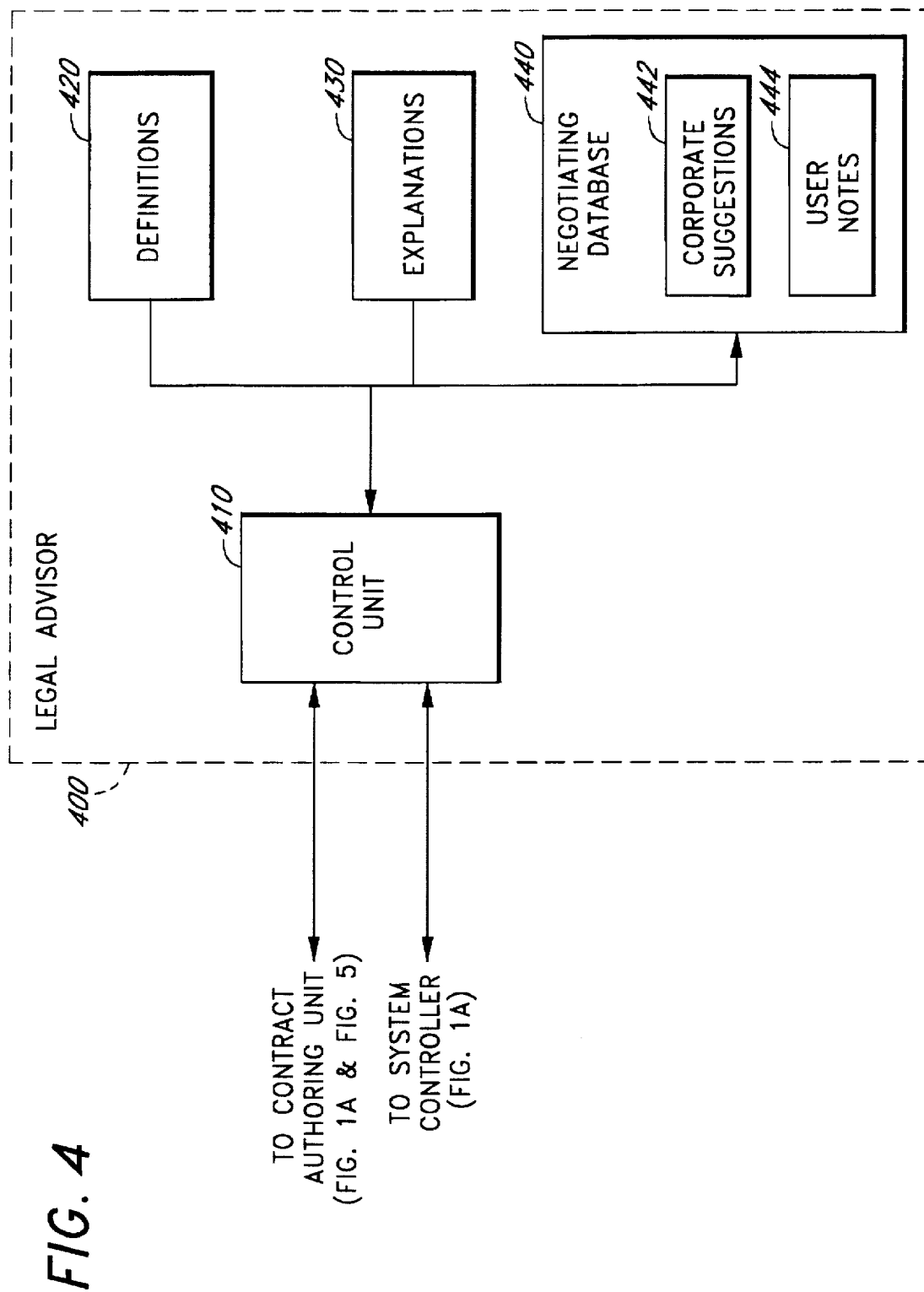
FIG. 4 illustrates a functional block diagram of the legal advisor of FIG. 1A.

FIG. 4 illustrates a functional block diagram of the legal advisor 400 of FIG. 1A. The legal advisor 400 comprises a control unit 410, one or more definitions 420, one or more explanations 430, and a negotiating database 440. The negotiating database 440 comprises one or more corporate suggestions 442 and one or more user notes 444. As illustrated in FIG. 4, the control unit 410 is coupled to the definitions 420, the explanations 430, and the negotiating database 440. The control unit 410 is also coupled to the contract authoring unit 500 and the system controller 102, as illustrated in FIG. 1A.

Figure 5:
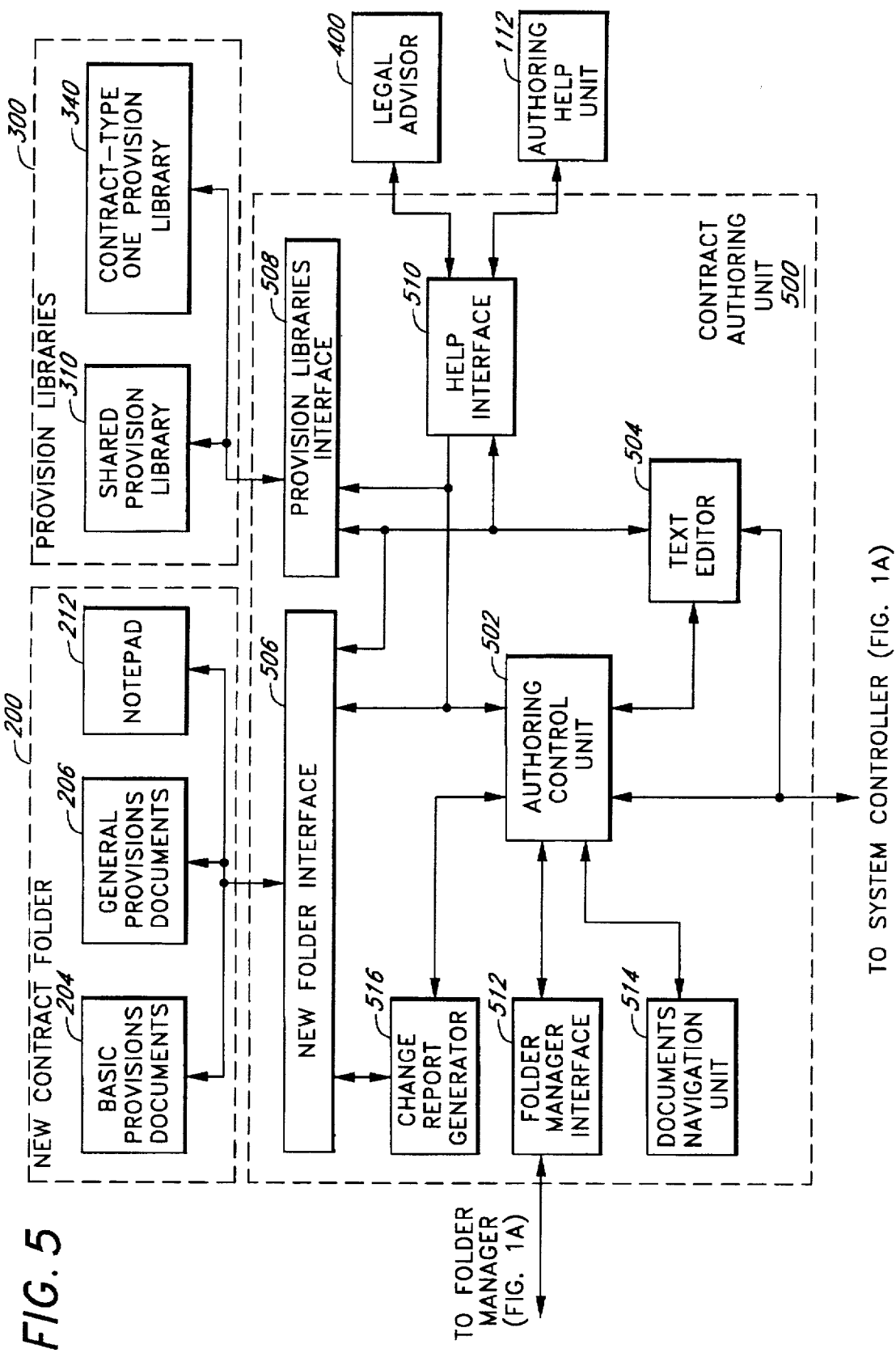
FIG. 5 illustrates a functional block diagram of the contract authoring unit, along with portions of the new contract folder, the provision libraries, the legal advisor, and the authoring help unit, all of FIG. 1A.

FIG. 5 illustrates a functional block diagram of the contract authoring unit 500 of FIG. 1A, along with portions of the new contract folder 200, the provision libraries 300, the legal advisor 400, and the authoring help unit 112. The contract authoring unit 500 comprises an authoring control unit 502, a text editor 504, a new folder interface 506, a provision libraries interface 508, a help interface 510, a folder manager interface 512, a document navigation unit 514, and a change report generator 516. FIG. 5 also illustrates the basic provisions documents 204, the general provisions documents 206, and the note pad 212 of the new contract folder 200. FIG. 5 also illustrates the shared provision library 310 and the contract-type one-provision library 340 of the provision libraries 300.

As illustrated in FIG. 5, the authoring control unit 502 is coupled to the text editor 504, the new folder interface 506, the provision libraries interface 508, the help interface 510, the folder manager interface 512, the document navigation unit 514, and the change report generator 516. The authoring control unit 502 is also coupled to the system controller 102, as illustrated in FIG. 1A. The text editor 504 is also coupled to the new folder interface 506, the provision libraries interface 508, and the help interface 510. The text editor 504 is also coupled to the system controller 102, as illustrated in FIG. 1A. The change report generator 516 is also coupled to the new folder interface 506. The new folder interface 506 is coupled to the basic provisions documents 204, the general provisions documents 206, and the note pad 212 of the new contract folder 200. The provision libraries interface 508 is coupled to the shared provision library 310 and the contract-type one-provision library 340 of the provision libraries 300. The help interface 510 is coupled to the legal advisor 400 and the authoring help unit 112. The folder manager interface 512 is coupled to the folder manager 104, as illustrated in FIG. 1A.

The existing contract folders 110, the standard contract documents 108, and the provision libraries 300 are preferably contained on the mass storage devices 117 of the personal computer 101. The new contract folder 200 is preferably contained in the system memory 115. The new contract folder 200 can also be saved into the existing contract folders 110 for more permanent storage. The contents of the new contract folder 200 can overwrite the contents of a previously created folder in the existing contract folders 110, or the contents of the new contract folder 200 can be stored into a newly created folder in the existing contract folders 110. The existing contract folders 110 generally comprise contract folders that have been previously generated by the contract generation system 100. In the preferred embodiment, each contract folder comprises all of the documents related to a single business deal.

As described above, with reference to FIG. 4, the legal advisor 400 comprises the definitions 420, the explanations 430, and the negotiating database 440. The definitions 420, the explanations 430, and the negotiating database 440 are also stored on the storage devices of the personal computer. Other units, such as the authoring help unit 112, also store data on the storage devices.

The user interface 106 (FIG. 1A) receives user inputs from input devices, such as the keyboard or the pointing device, and provides information to the user through output devices, such as the video display and the printer. In the preferred embodiment, the user interface 106 is based on the Microsoft® Windows™ graphical user interface.

The folder manager 104, the contract authoring unit 500, the authoring help unit 112, the auxiliary document unit 114, the system controller 102, the user interface 106, the control unit 410 of the legal advisor 400, the authoring help unit 112, the data entry unit 116, the revision maintenance unit 118, the redline unit 120, the print unit 122, and the E-Mail unit 124 are generally implemented in one or more computer programs on the personal computer.

Figure 6:
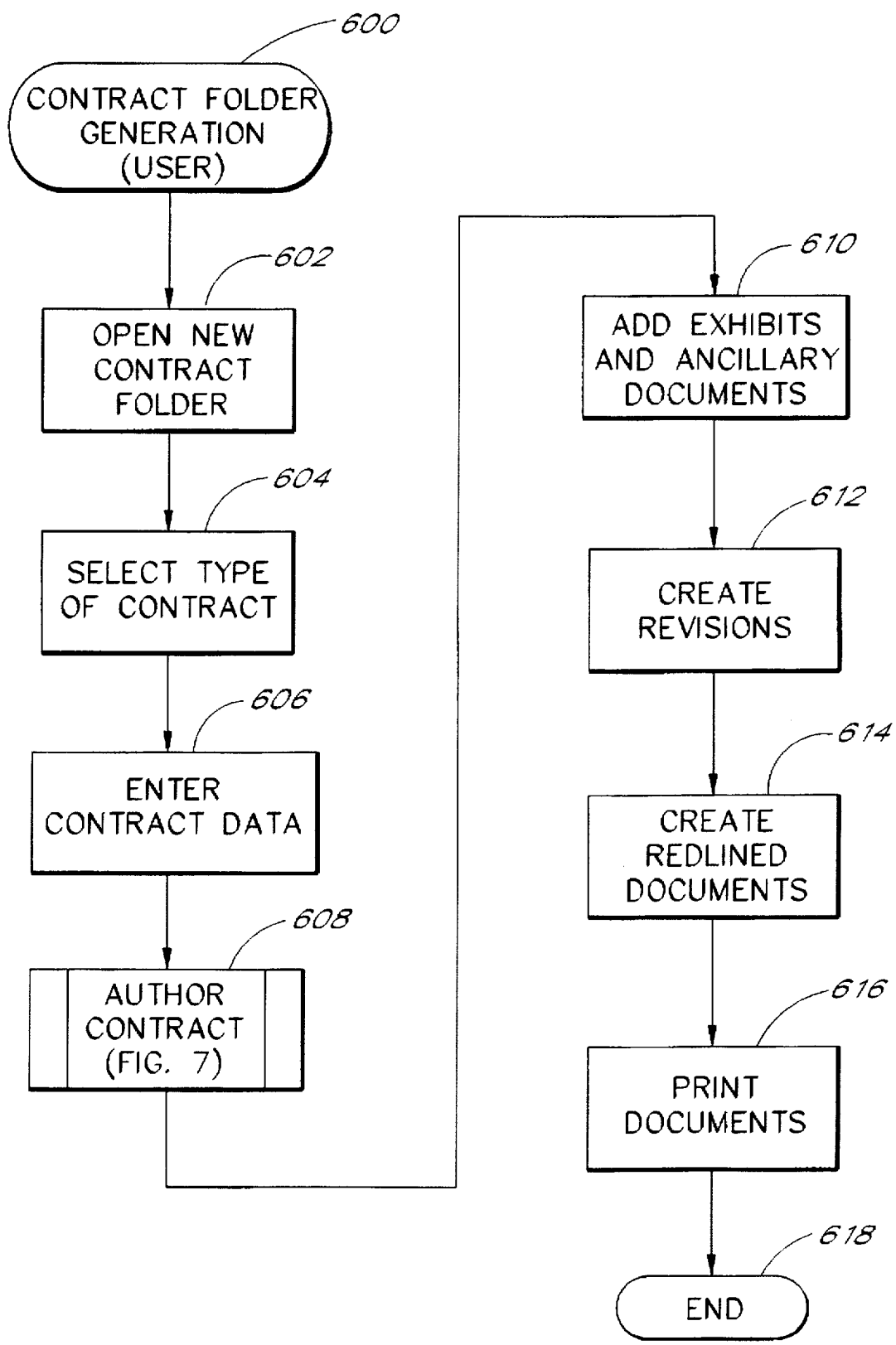
FIG. 6 illustrates a flowchart of a method for a user to generate a contract folder using the contract generation system of the present invention.

FIG. 6 illustrates a flowchart of a method for a user to generate a contract folder using the contract generation system 100 of the present invention. The method of FIG. 6 comprises a relatively simple sequence of eight general steps. However, the general steps represented in FIG. 6, as well as a number of other steps, can be combined in numerous ways to generate a contract folder. The user has many options for changing the order in which the various steps are executed, or to perform selected steps multiple times. The method of FIG. 6 is merely representative of a large number of methods in which a user can utilize the contract generation system 100 to generate a contract folder.

The method of FIG. 6 begins at an initial block 600. At a process block 602, the user opens a new contract folder using the contract generation system 100. The new contract folder is opened as the new contract folder 200, as illustrated in FIGS. 1A, 1B and 2.

At a process block 604, the user selects the type of contract that will be generated. In one embodiment of the present invention, for example, the contract may be a ground lease, a real estate purchase, a space lease, or a shopping center lease. After the user has selected the type of contract, the contract generation system 100 copies appropriate basic provisions documents 204, general provisions documents 206 and exhibits 208 into the new contract folder 200.

As represented by a process block 606, the user enters relevant contract data. The data entered during this step may include, for example, the names and addresses of the parties to the contract, the term of the contract, and relevant financial information. The contract generation system 100 places the entered data into the database 202 of the new contract folder 200. The data that is entered into the database 202 is used by the contract generation system 100 to fill in blanks in the basic provisions documents 204. The data may also be used to fill in blanks in one or more of the exhibits 208 and one or more of the ancillary documents 210. Additional data may also be entered at a later stage of the contract generation process.

As represented by a process block 608, the user authors the contract. This step is described in greater detail below with reference to FIG. 7. Generally the step of authoring the contract involves editing the text of the provisions and selecting additional and alternative provision to customize the agreement.

As represented by a process block 610, the user adds exhibits and ancillary documents to the contract folder, as required by company policy or as desired by the user. An exhibit may comprise, for example, a detailed description of property involved in the transaction. The ancillary documents may comprise additional legal documents or internal company forms needed to supplement and process the primary contract such as payment schedules, due dates, etc.

At a process block 612, the user creates one or more revisions to the general provisions document (in the new contract). For example, the user may create a revision to the general provisions document 206 when the user wants to propose a change in the provisions of the contemplated agreement. The process of creating a revision retains a copy of the previous version in the new contract folder 200. Thus, if the proposed change to the general provisions document 206 is not accepted, the user can retrieve the previous version of the general provisions document 206 and continue the negotiations.

As represented by a process block 614, the user creates one or more redline documents 218. A redline document 218 indicates differences between two specified documents. Thus, when a redline document 218 is generated for two revisions of a single document, the redline document indicates changes (both additions and deletions) that have been made between the different versions of the document. A redline document 218 can be used for two primary purposes. First, a redline document 218 can be generated for two different versions of a single document to indicate the changes that the user is proposing. Second, a redline document 218 can be created between a standard contract document 108 and the most recent revision of a document in the new contract folder 200 to quickly determine the particular changes that have been made to customize the present contract.

As represented by a process block 616, the user can print the documents as required. The documents can be printed in various formats. For example, the documents can be printed to appear as if they were preprinted forms, to discourage the opposing party in the negotiations from requesting changes to the contract. The method illustrated in FIG. 6 ends at a terminal block 618.

Figure 7:
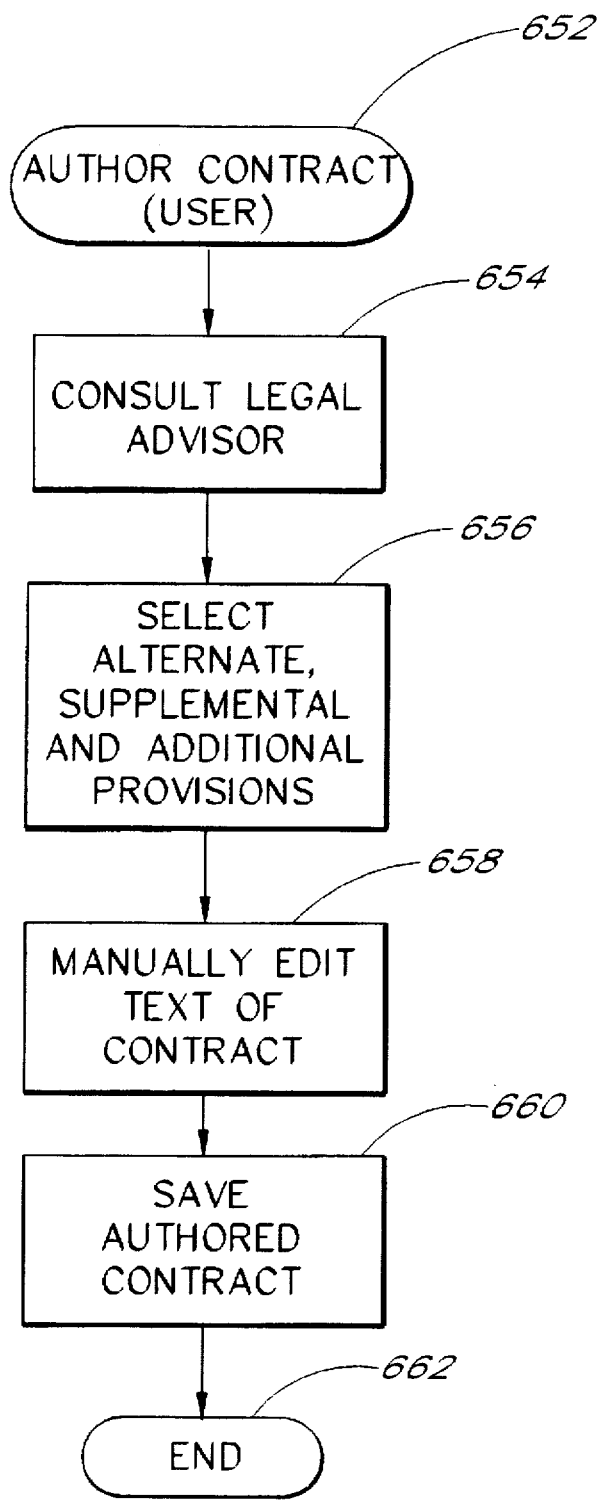
FIG. 7 illustrates a flowchart of a method for a user to author a contract using the contract generation system of the present invention.

FIG. 7 illustrates a flowchart of a method that can be performed by a user to author a contract using the contract generation system 100 of the present invention. When authoring a contract, a user generally determines the contents of the general provisions document 206 of the new contract folder 200. Again, the process of authoring a contract may include various other steps, or the process may involve the steps of FIG. 7 arranged in various different sequences. The method of FIG. 7 begins at an initial block 652.

As represented by a process block 654, the user may consult the legal advisor 400. The legal advisor 400 provides context sensitive information from the definitions 420, the explanations 430, and the corporate suggestions 442. The information provided may relate to provisions of the standard contract documents 108, as well as to provisions in the standard provisions 320, 350, and 380 of the provision libraries 300. The legal advisor 400 also provides user notes from the user notes 444 in the negotiating database 440. The user notes 444 provided by the legal advisor 400 may relate to provisions of the standard contract documents 108, as well as to any of the provisions in the provision libraries 300. Thus, a user can move the cursor to a provision in the general provisions document 206 for which information is desired and activate the legal advisor 400. The legal advisor 400 then provides information related to the provision from one or more of: the definitions 420, the explanations 430, the corporate suggestions 442 and the user notes 444. The user can also cause the legal advisor 400 to search for information related to user-entered key words, or otherwise navigate through the legal advisor 400 to find desired information.

As represented by a process block 656, the user selects alternate, supplemental, and additional provisions from the provision libraries 300, to be incorporated into the general provisions document 206.

To select alternate provisions from the alternate provision sets 322, 332, 352, 362, 382, and 392, in the provision libraries 300, the user moves the cursor to a provision in the general provisions document 206 for which an alternate provision is desired and selects a function of "alternate provisions." The contract authoring unit 500 then provides a list of related alternate provisions from one or more of the alternate provision sets 322, 332, 352, 362, 382, and 392. The user then selects one of the alternate provisions, and the contract authoring unit 500 replaces the current provision with the selected alternate provision.

To select supplemental provisions from the supplemental provision sets 324, 334, 354, 364, 384, and 394, in the provision libraries 300, the user moves the cursor to a provision in the general provisions document 206 for which a supplemental provision is desired and selects a function of "supplemental provisions." The contract authoring unit 500 then provides supplemental provisions related to the current provision from one or more of the supplemental provision sets 324, 334, 354, 364, 384, and 394. The user then selects one of the supplemental provisions, and the contract authoring unit 500 places the selected supplemental provision in the general provisions document 206 below the current provision.

To select additional provisions from the additional provision sets 326, 336, 356, 366, 386, and 396, in the provision libraries 300, the user moves the cursor to a provision in the general provisions document 206 below which the additional provision is to be placed and selects a function of "additional provisions." The contract authoring unit 500 then provides additional provisions from one or more of the additional provision sets 326, 336, 356, 366, 386, and 396. The user then selects one of the additional provisions, and the contract authoring unit 500 places the selected additional provision in the general provisions document 206 below the current provision.

As represented by a process block 658, the user utilizes the text editor 504 of the contract authoring unit 500 to manually edit the text of the general provisions document 206. In the preferred embodiment, the text editor 504 is implemented using Microsoft® Word.

At a process block 660, the user saves the authored contract from the new contract folder 200 to an existing contract folder 110. The process of FIG. 7 ends at a terminal block 662.

Figure 8:
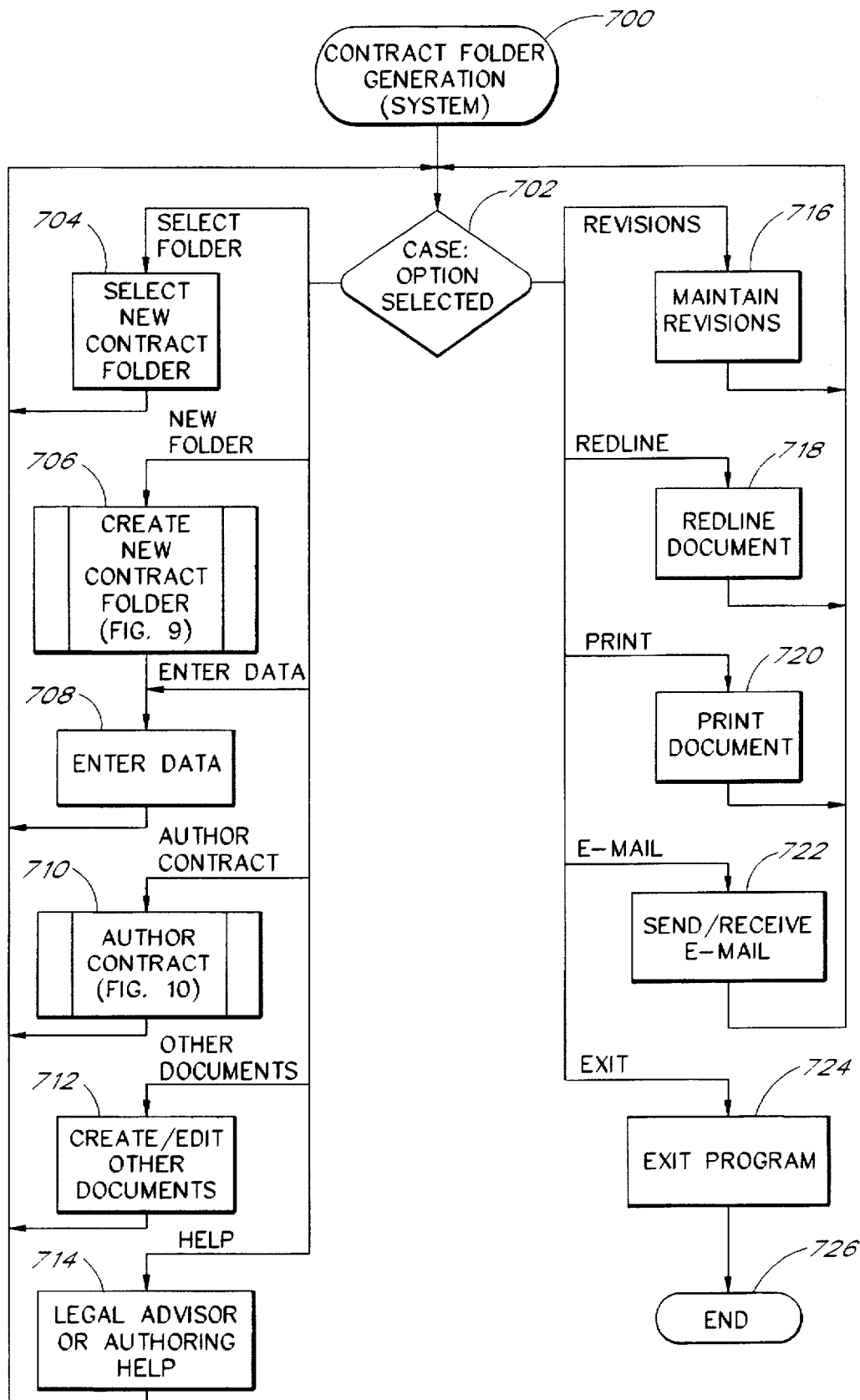
FIG. 8 illustrates a flowchart of a preferred method that is performed by the contract generation system of the present invention to allow for the generation of a contract folder.

FIG. 8 illustrates a flowchart of a method performed by the contract generation system 100 to allow a user to generate a contract folder. The method begins at an initial start block 700.

As represented by a decision block 702, the system controller 102 controls the user interface 106 to display a partial or complete list of the set of existing contract folders 110. The folder manager 104 provides information about the set of existing contract folders 110 to the system controller 102. The system controller 102 waits for a user input from the user interface 106. Depending on the particular selection made by the user, the system controller 102 branches to a different process block illustrated in FIG. 8. The operation of the system controller 102 at the decision block 702, in response to a user input, is analogous to the execution of a case statement in the C programming language.

If the user selects a folder from the list of existing contract folders 110 (decision block 702), the system controller 102 branches to a process block 704. At the process block 704, the system controller 102 activates the folder manager 104 and provides an indication to the folder manager 104 of the user's folder selection. The folder manager 104 identifies the selected folder as the new contract folder 200. In the preferred embodiment, the selected folder is not copied into a separate new contract folder 200. After the process block 704, the system controller 102 returns to the decision block 702.

If, at the decision block 702, the user selects a new folder function, the system controller 102 branches to a process block 706. At the process block 706, the system controller 102 activates the folder manager 104. The folder manager 104 proceeds to create a new contract folder. The method performed by the folder manager 104 to create a new contract folder is described in greater detail below, with reference to FIG. 9. After the process block 706, the system controller 102 proceeds to a process block 708.

If, at the decision block 702, the user selects an enter data function, the system controller 102 branches to the process block 708. At the process block 708, the system controller 102 prompts the folder manager 104 to load the database 202 from the new contract folder 200 into system memory. The system controller 102 then activates the data entry unit 116 to control the data entry function. The data entry unit 116 generates dialogue boxes covering all of the data that can be entered into the database 202, including required data and optional data. The data that can be entered may include information identifying the parties to the agreement, as well as financial terms and relevant time frames. The data entry unit 116 receives user input from the user interface 106 and allows the user to move the cursor to different dialogue boxes representing different fields of data that can be entered into the database 202. As the user enters data into a dialogue box, the data entry unit 116 enters the data into a corresponding location in the database 202 in the system memory.

When the user terminates the data entry function, by, for example, clicking a mouse button when the cursor is in an "OK" button, the folder manager 104 copies the database 202 from the system memory into the new contract folder 200. The newly entered data is then automatically linked into data fields within the basic provisions document 204, and the data may also be linked into data fields within one or more exhibits 208 or ancillary documents 210. After the process block 708, the system controller 102 returns to the decision block 702.

If, at the decision block 702, the user selects an author contract function, the system controller 102 branches to a process block 710. At the process block 710, the system controller 102 prompts the folder manager 104 to load the general provisions document 206 from the new contract folder 200 into system memory. The system controller 102 then activates the contract authoring unit 500 to control the contract authoring function. The method performed by the contract authoring unit 500 to allow a user to author a contract is described in greater detail below, with reference to FIG. 10. When the user terminates the contract authoring function, the folder manager 104 copies the general provisions document 206 from the system memory into the new contract folder 200. After the process block 710, the system controller 102 returns to the decision block 702.

If, at the decision block 702, the user selects a create or edit other documents function, the system controller 102 branches to a process block 712. At the process block 712, the system controller 102 activates the auxiliary document unit 114. The auxiliary document unit 114 obtains information from the folder manager 104 regarding different documents that can be generated or added to a contract folder, and lists these documents for selection by the user. The standard contract documents 108 contain various documents that may also be used in negotiating or documenting the agreement between the parties. There are also documents which provide payment schedules, due dates, completion dates, termination dates, and other action items pertinent to the particular contract. In one embodiment, such schedules can be generated automatically from the data entered into the database for a particular contract. The user can select a listed document, or create a new document. If a listed document is selected, a copy of the selected document is copied into system memory. The auxiliary document unit 114 then activates the word processing program to allow the user to edit the document, as required. When the user is finished editing the document, the document is saved into the new contract folder 200. At this point, the user may create and edit another document, or the user may terminate the create or edit other documents function. When the function is terminated, the system controller 102 returns to the decision block 702.

If, at the decision block 702, the user selects a legal advisor or authoring help function, the system controller 102 branches to a process block 714. If the user selects the legal advisor function, the system controller 102 interfaces with the legal advisor control unit 410 to provide the user with access to the functions of the legal advisor 400. If the user selects the authoring help function, the system controller 102 interfaces with the authoring help unit 112 to provide the user with access to the functions of the authoring help unit 112. The functions provided by the legal advisor 400 and the authoring help unit 112 are described in greater detail below, with reference to FIG. 10. When the user terminates the legal advisor function or the authoring help function, the system controller 102 returns to the decision block 702.

If, at the decision block 702, the user selects a maintain revisions function, the system controller 102 branches to a process block 716. At the process block 716, the user can select to create a new revision of the general provisions document 204, or to create a new revision of another document. If the user selects to create a new revision of the general provisions document 204, the system controller 102 activates the revision maintenance unit 118. The revision maintenance unit 118 copies the general provisions document 204 into the new contract folder 200, under a revision number, such as revision 1. The revision maintenance unit 118 creates a new general provisions document 204 under the next subsequent revision number, such as revision 2. At this point, the subsequent revision is the same as the previous revision. Subsequent editing of the general provisions document 204 is performed on the subsequent revision. The previous revision can be utilized if the user decides to undo subsequent changes to the general provisions document 204. The previous revision can also be utilized to indicate redline changes between the previous revision and the current revision.

In a present embodiment, the user can use the word processor or the folder manager 104 to create new revisions for other documents. In an alternative embodiment, the revision maintenance unit 118 can also be used to create new revisions for the other documents. After the process block 716, the system controller 102 returns to the decision block 702.

If, at the decision block 702, the user selects a redline function, the system controller 102 branches to a process block 718. At the process block 718, the system controller 102 activates the redline unit 120. The redline unit 120 prompts the user to select to files to be compared. A redline comparison is typically done between a current document and either a corresponding standard document or a previous revision of the same document. The redline unit 120 generates a new file that specifies the differences between the two files selected by the user, without affecting the selected files. The redline unit 120 may be implemented, for example a redlining program such as CompareRite. After the process block 718, the system controller 102 returns to the decision block 702.

If, at the decision block 702, the user selects a print function, the system controller 102 branches to a process block 720. At the process block 720, the system controller 102 activates the print unit 122. The print unit 122 displays a list of the files in the new contract folder 200, and prompts the user to select one or more files for printing. When the user has made a selection, the print unit 122 prints the files to an assigned printer. After the process block 720, the system controller 102 returns to the decision block 702.

If, at the decision block 702, the user selects an E-Mail function, the system controller 102 branches to a process block 722. At the process block 722, the system controller 102 activates the E-Mail unit 124. The E-Mail unit 124 provides conventional electronic mail functions to the user. For example, the E-Mail unit 124 allows the user to transmit files via electronic mail, as described immediately below. The E-Mail unit 124 displays a list of the files in the new contract folder 200, and prompts the user to select one or more files for transmission. The E-Mail unit 124 also prompts the user to select a destination for the electronic mailing. When the user has made the selections, the E-Mail unit 124 transmits the selected files to the specified destination. The E-Mail unit 124 can be implemented by the Microsoft® Mail Remote. After the process block 722, the system controller 102 returns to the decision block 702.

If, at the decision block 702, the user selects an exit function, the system controller 102 branches to a process block 724. At the process block 724, the system controller 102 executes an exit routine before terminating the program. After the system controller 102 has completed the exit routine, the system controller 102 advances to a terminal block 726. The method of FIG. 8 ends at the terminal block 726.

Figure 9:
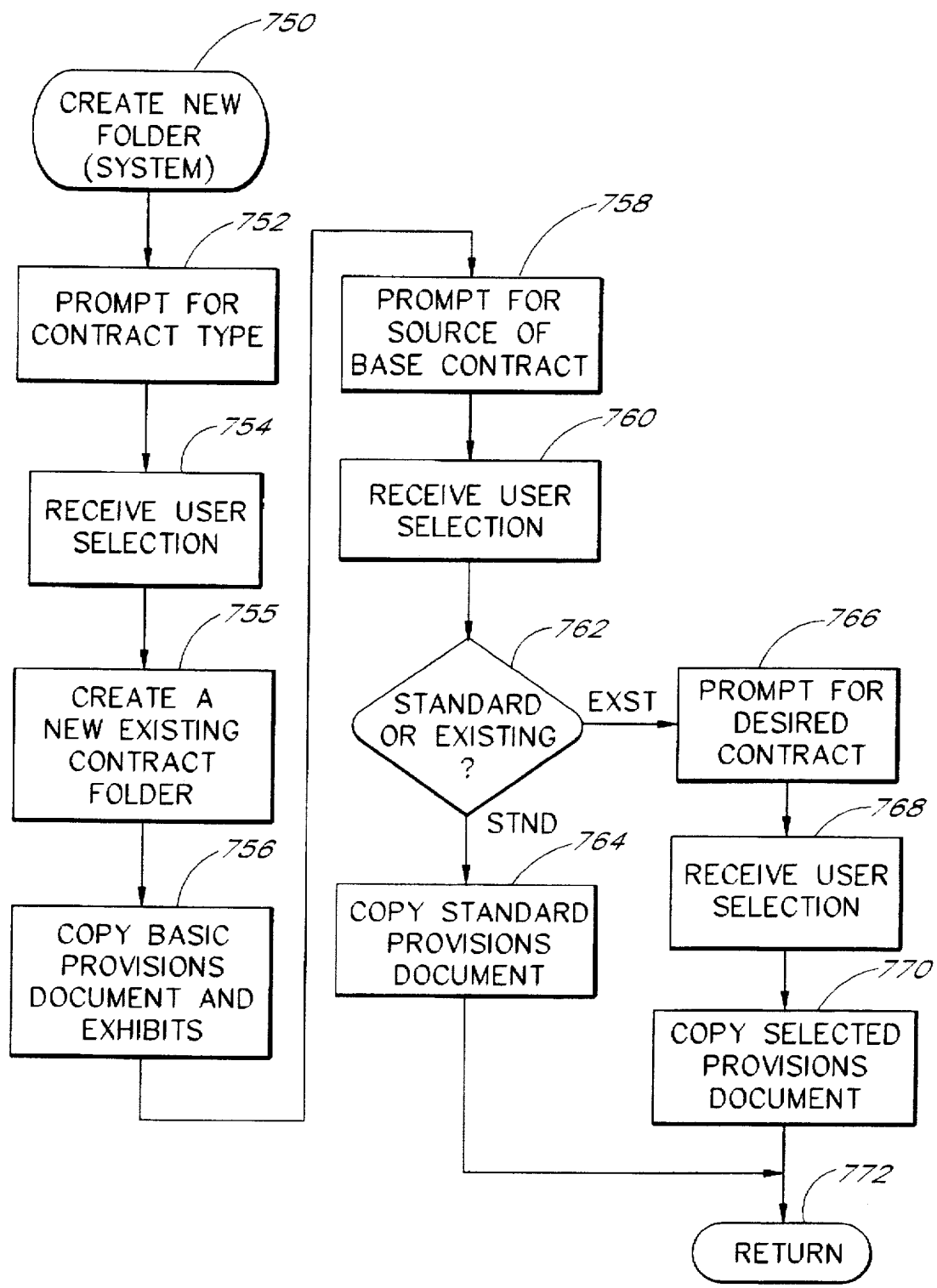
FIG. 9 illustrates a flowchart of a preferred method that is performed by the contract generation system of the present invention to create a new contract folder.

FIG. 9 illustrates a flowchart of a method performed by the folder manager 104 to allow a user to create a new contract folder. The method of FIG. 9 begins at an initial block 750.

As represented by a process block 752, the folder manager 104 prompts the user to select a contract type to be authored. As represented by a process block 754, the folder manager 104 receives a user input selecting a contract type. The folder manager 104 may also prompt the user to enter a site number or other information to identify the contract to be authored.

At a process block 755, the folder manager 104 creates a new existing contract folder 110 on the hard drive of the computer system. The folder manager 104 also identifies the new existing contract folder 110 as the new contract folder 200.

At a process block 756, the folder manager 104 copies a basic provisions document 204, a general provisions document and possibly one or more exhibits 208, corresponding to the selected contract type, from the standard contract documents 108 to the new contract folder 200.

At a process block 758, the folder manager 104 prompts the user to select a source for the base contract. The user may select a standard contract or an existing contract. At a process block 760, the folder manager 104 receives a user input selecting a source for the base contract.

At a decision block 762, the folder manager 104 determines whether the user has selected a standard contract or an existing contract. If the user has selected a standard contract, the folder manager 104 advances to a process block 764. Otherwise, the folder manager 104 advances to a process block 766.

At the process block 764, the folder manager 104 copies a general provisions document 206, corresponding to the selected contract type, from the standard contract documents 108 to the new contract folder 200. After the process block 764, the folder manager 764 advances to a return block 772.

At the process block 766, the folder manager 104 provides a list of the existing contract folders 110, and prompts the user to select an existing contract folder 110. At a process block 768, the folder manager 104 receives a user input selecting an existing contract folder 110. At a process block 770, the folder manager 104 copies a general provisions document 206 from the selected existing contract folder 110 to the new contract folder 200. After the process block 764, the folder manager 764 advances to the terminal block 772. The method of FIG. 9 ends at the return block 772.

Figure 10:
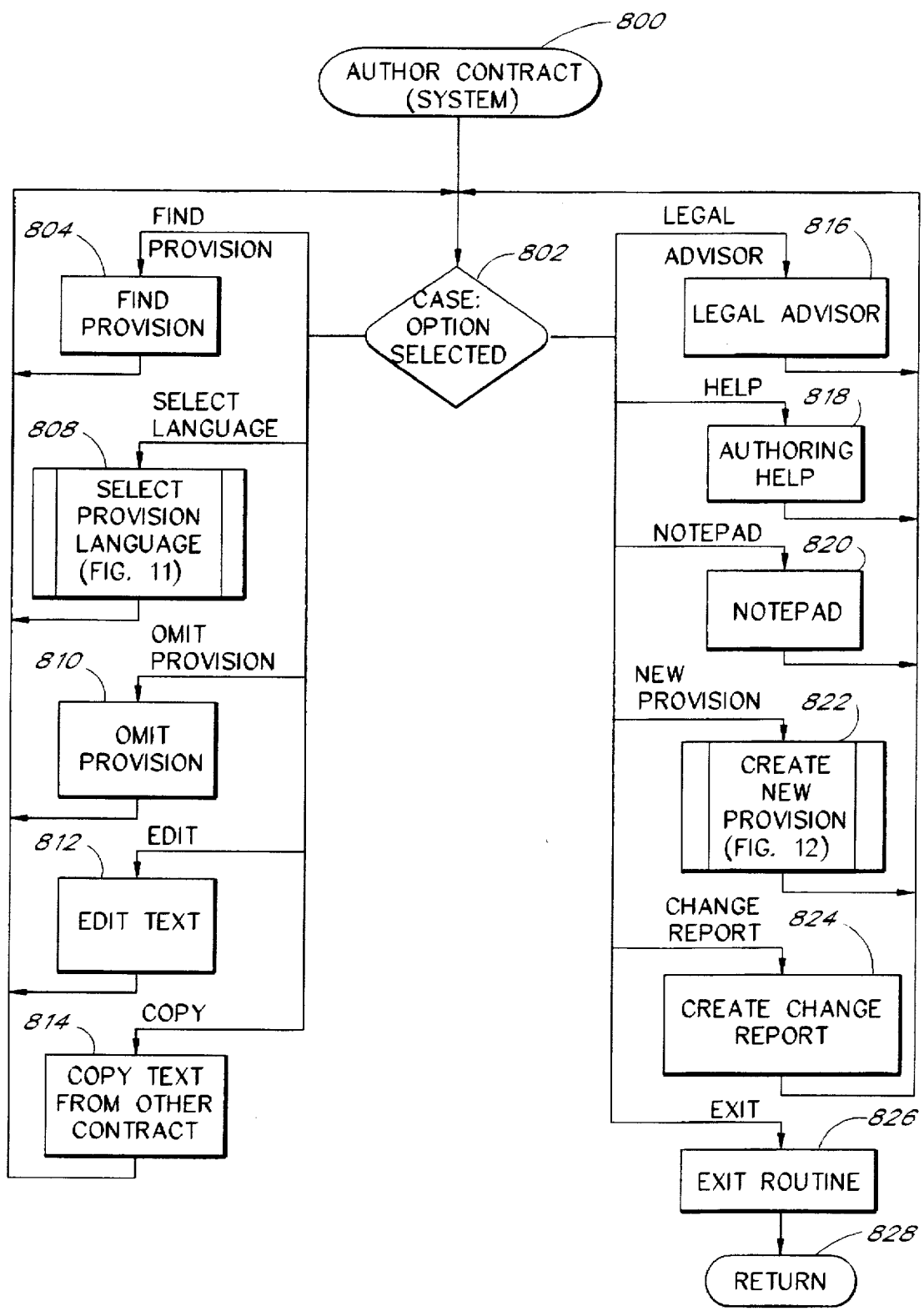
FIG. 10 illustrates a flowchart of a preferred method that is performed by the contract authoring unit of FIGS. 1A and 5 to allow for a contract to be authored.

FIG. 10 illustrates a flowchart of a method performed by the contract authoring unit 500 to allow a user to author a contract by generating a deal specific general provisions document 204. The method begins at an initial block 800.

At a decision block 802, the authoring control unit 502 controls the user interface 106 through the system controller 102 to display a portion of the general provisions document 206 of the new contract folder 200. In the preferred embodiment, the contract authoring unit 502 also provides a mode in which only the title of each provision of the general provisions document 206 is listed, so that the user is not required to read through the text of each provision. The authoring control unit 502, as well as other units within the contract authoring unit 500, uses the new folder interface 506 to interface with the new contract folder 200. Similarly, the units within the contract authoring unit 500 use the provision libraries interface 508 to interface with the provision libraries 300, the help interface 510 to interface with the legal advisor 400 and the authoring help unit 112, and the folder manager interface 512 to interface with the folder manager 104.

While the authoring control unit 502 is executing the decision block 802, the user can move the cursor to any of the provisions within the general provisions document 206. The authoring control unit 502 waits for a user input from the user interface 106 to select a function for execution. The selected function is generally executed relative to the provision in or on which the cursor has been placed before the function is selected. The provision in or on which the cursor has been placed is defined as the current provision. Depending on the particular selection made by the user, the authoring control unit 502 branches to a different process block illustrated in FIG. 10. The operation of the authoring control unit 502 at the decision block 802, in response to a user input, is also analogous to the execution of a case statement in the C-programming language.

If, at the decision block 802, the user selects a find provision function, the authoring control unit 502 branches to a process block 804. At the process block 804, the authoring control unit 502 activates the document navigation unit 514. The document navigation unit 514 provides a list of the titles of the provisions in the general provisions document 206. The document navigation unit 514 then waits for a user input that selects a provision. The user can select a provision by entering a number corresponding to the desired provision, or by selecting the desired provision in the list of provisions. The user may also activate a textual search function provided by the document navigation unit 514 to find the first occurrence of user specified search text either above or below the current cursor position. After the user has selected a provision, the document navigation unit 514 places the cursor in the selected provision in the general provisions document 206. After the process block 804, the authoring control unit 502 returns to the decision block 802.

If, at the decision block 802, the user selects a select provision language function, the authoring control unit 502 branches to the process block 808. At the process block 808, the authoring control unit 502 performs a method that allows the user to select provision language to be inserted into the general provisions document 206. The selected provision language may replace existing language in the general provisions document 206, or it may be added to the general provisions document 206, without removing any provision language from the general provisions document 206. The method performed by the authoring control unit 502 to allow a user to select provision language is described in greater detail below, with reference to FIGS. 11A and 11B. After the user has selected the desired provision language, the authoring control unit 502 returns to the decision block 802.

If, at the decision block 802, the user selects an omit provision function, the authoring control unit 502 branches to a process block 810. At the process block 810, the authoring control unit 502 determines whether the provision selected for deletion is a mandatory provision for the contract. Mandatory provisions can be pre-defined as mandatory. If the provision selected for deletion is a mandatory provision, the authoring unit provides a warning to the user of the mandatory nature of the provision. The user can either abort the deletion task or choose to delete the provision. In an alternative embodiment, the user could be prevented from deleting mandatory provisions. If the provision is not a mandatory provision or if the user chooses to delete the mandatory provision, the authoring control unit 502 deletes the provision on which the cursor has been placed. In the preferred embodiment, the authoring control unit 502 replaces the provision language with the phrase "Intentionally Omitted." After the process block 810, the authoring control unit 502 returns to the decision block 802.

If, at the decision block 802, the user selects an edit text function, the authoring control unit 502 branches to a process block 812. At the process block 812, the authoring control unit 502 activates the text editor 504. The text editor 504 responds to user inputs and allows the user to edit the text of the provision in which the cursor has been placed. When the user terminates the edit text function, the authoring control unit 502 returns to the decision block 802.

If, at the decision block 802, the user selects a copy text function, the authoring control unit 502 branches to a process block 814. At the process block 814, the authoring control unit 502 interfaces with the folder manager 104 to provide a list of the existing contract folders 110 from which the user can copy text for the current provision. The authoring control unit 502 then prompts the user to select the existing contract folder 110 from which to copy the provision language. Upon receiving the user selection, the authoring control unit 502 interfaces with the folder manager 104 again to obtain the provision language from the corresponding provision of the general provisions document 206 of the selected existing contract folder 110. The authoring control unit 502 copies the selected provision language into the general provisions document 206 of the new contract folder 200 at the current provision. After the process block 814, the authoring control unit 502 returns to the decision block 802.

If, at the decision block 802, the user selects a legal advisor function, the authoring control unit 502 branches to a process block 816. At the process block 816, the authoring control unit 502 interfaces with the legal advisor control unit 410 to obtain one or more of the definitions 420, the explanations 430, the corporate suggestions 442, and the user notes 444. The authoring control unit 502 preferably displays some or all of the information obtained from the legal advisor 400. The authoring control unit 502 then receives user inputs, and allows the user to move the cursor around within the displayed information, so that the user can find and read the desired information. The user can also utilize the legal advisor control unit 410 to navigate through the information available in the legal advisor 400. The legal advisor control unit 410 provides various searching capabilities. For example, the user can enter search text, and the control unit 410 displays the text surrounding the first occurrence of the specified text in the direction indicated by the user.

The information provided by the legal advisor 400 may comprise various types of information for assisting the user in negotiating an agreement and generating a contract folder. For example, the legal advisor 400 may provide legal information on various topics, including information that is specific to the state in which the contract will take effect. The legal advisor 400 may also contain suggestions from the legal department related to various matters. When the user terminates the legal advisor function, the authoring control unit 502 returns to the decision block 802.

If, at the decision block 802, the user selects an authoring help function, the authoring control unit 502 branches to a process block 818. At the process block 818, the authoring control unit 502 interfaces with the authoring help unit 112 to provide an alphabetical list of authoring subjects for which help is available. In the preferred embodiment, authoring help is available for various topics related to each of the functions provided by the contract authoring unit 500. For example, one topic covered by the authoring help unit 112 may relate to the omit provision function. In this case, the authoring help unit 112 would provide information about the purpose and use of the omit provision function. The authoring control unit 502 receives a user input to select an authoring help topic. The authoring control unit 502 then displays the authoring help information, so that the user can obtain the desired information. After the user terminates the authoring help function, the authoring control unit 502 returns to the decision block 802.

If, at the decision block 802, the user selects a note pad function, the authoring control unit 502 branches to a process block 820. At the process block 820, the authoring control unit 502 couples the text editor 504 with the note pad 212, and activates the text editor 504. The user can now utilize the text editor 504 to edit the text in the note pad 212. In the preferred embodiment, the note pad 212 is typically utilized by the user to record notes related to the negotiation process or the generation of the contract folder. When the user terminates the note pad function, the authoring control unit 502 returns to the decision block 802.

If, at the decision block 802, the user selects a create new provision function, the authoring control unit 502 branches to a process block 822. At the process block 822, the authoring control unit 502 performs a method that allows the user to create a new contract provision. The method performed by the authoring control unit 502 to allow a user to create a new contract provision is described in greater detail below, with reference to FIGS. 12A, 12B, and 12C. After the user has finished creating the new provision, the authoring control unit 502 returns to the decision block 802.

If, at the decision block 802, the user selects a create change report function, the authoring control unit 502 branches to a process block 824. At the process block 824, the authoring control unit 502 activates the change report generator 516. The change report generator 516 generates a change report, which lists, in a table format, all the alternate, supplemental, and additional provisions that have been incorporated into the general provisions document 204. The change report can be reviewed to quickly determine the major changes that have been made in the current contract.

After the process block 824, the authoring control unit 502 returns to the decision block 802.

If, at the decision block 802, the user selects an exit function, the authoring control unit 502 branches to a process block 826. At the process block 826, the authoring control unit 502 executes an exit routine before terminating the contract authoring function. In particular, the authoring control unit 502 prompts the user to determine whether the modified general provisions document 206 is to be saved. If the user elects to save the general provisions document 206, the authoring control unit interfaces with the folder manager 104 to copy the general provisions document 206 from the system memory into the new contract folder 200 on the hard drive. The user can also command the authoring control unit 502 to save the general provisions document 206 at other times during the contract authoring function.

After the authoring control unit 502 has completed the exit routine, the authoring control unit 502 advances to a return block 828. The method of FIG. 10 ends at the return block 828.

Figure 11A:
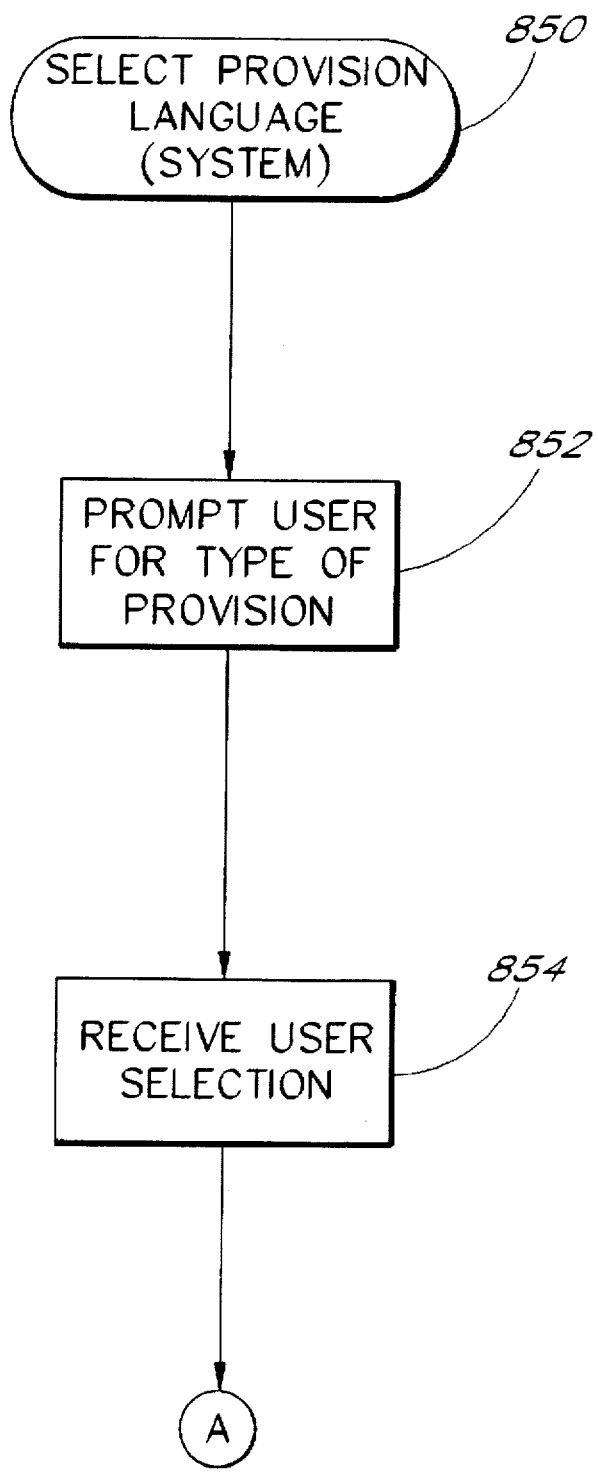
FIGS. 11A and 11B illustrate a flowchart of a preferred method that is performed by the contract authoring unit of FIGS. 1A and 5 to allow for the selection of language for a contract provision.
Figure 11B:
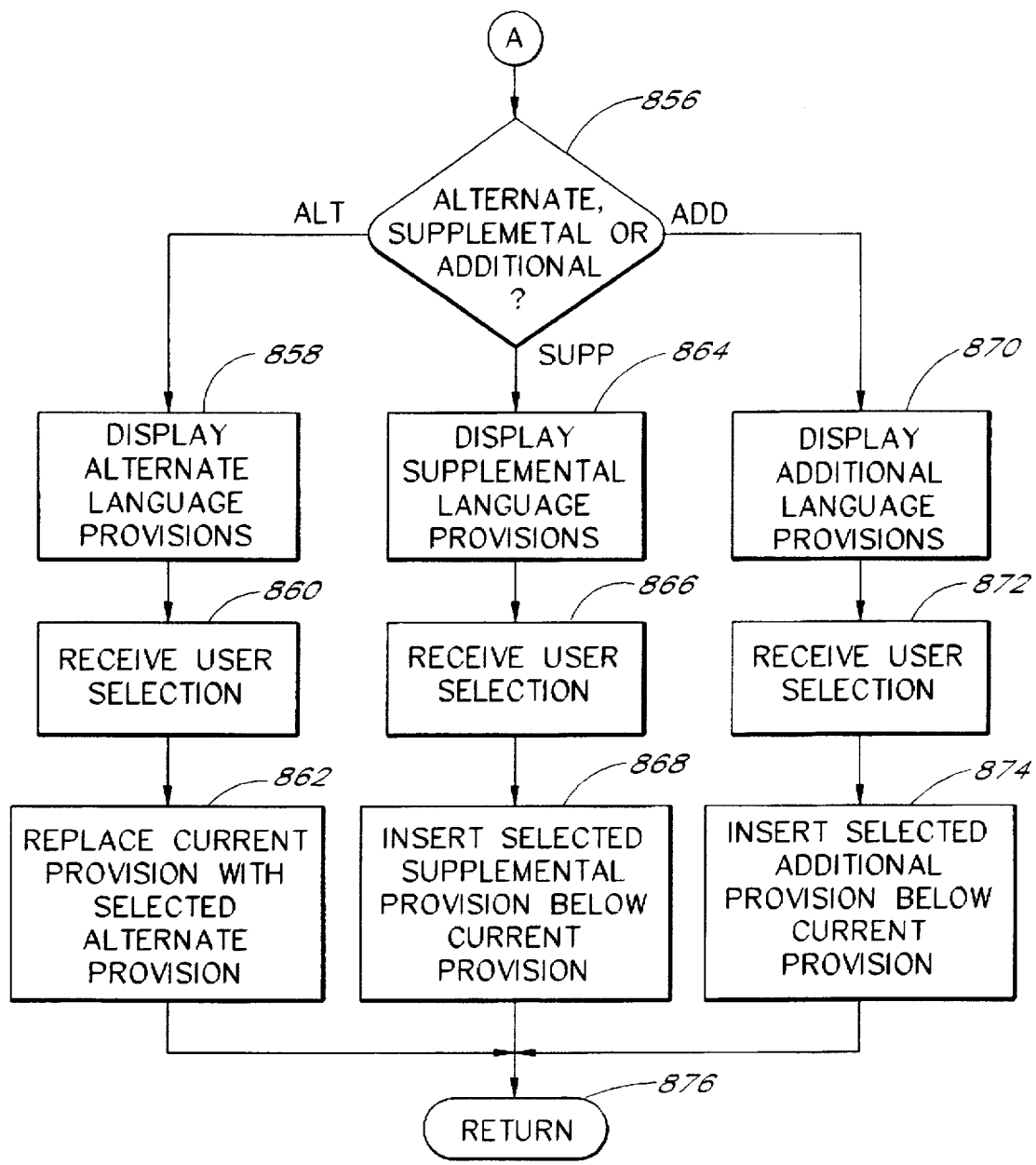

FIGS. 11A and 11B illustrate a flowchart of a method performed by the authoring control unit 502 to allow a user to select provision language for the current provision. The method of FIGS. 11A and 11B begins at an initial block 850, in FIG. 11A.

At a process block 852, the authoring control unit 502 prompts the user to select a type of provision to be selected. The user may indicate an alternate provision, a supplemental provision, or an additional provision. At a process block 854, the authoring control unit 502 receives a user input selecting a provision type.

At a decision block 856, the authoring control unit 502 determines which type of provision is indicated by the user. If the user indicates an alternate provision, the authoring control unit 502 advances to a process block 858. If the user indicates a supplemental provision, the authoring control unit 502 advances to a process block 864. If the user indicates an additional provision, the authoring control unit 502 advances to a process block 870.

At the process block 858, the authoring control unit 502 interfaces with the provision libraries 300 to provide a list of alternate provisions corresponding to the current provision, that can be selected by the user. In the preferred embodiment, the authoring control unit 502 lists the corresponding alternate provisions from the shared provision library 310 and from the contract-type provision library 340 or 370 that corresponds to the contract type of the new contract folder 200. Specifically, if the new contract folder 200 corresponds to the contract-type one-provision library 340, the authoring control unit 502 lists the corresponding alternate provisions from the alternate provisions 352 and 362. In the preferred embodiment, the standard provisions 320, 350, and 380 contain corporate-supplied, pre-approved language. The user-defined provisions 330, 360, and 390, on the other hand, are created by the user. Depending on corporate policy, the user may need to obtain corporate approval before inserting a user-defined provision 330, 360 or 390 into a general provisions document 206. The authoring control unit 502 then prompts the user to select an alternate provision from the list. At a process block 860, the authoring control unit 502 receives a user input selecting an alternate provision from the displayed list.

At a process block 862, the authoring control unit 502 replaces the provision language of the current provision with the provision language of the selected alternate provision. After the process block 862, the authoring control unit 502 advances to a return block 876.

At the process block 864, the authoring control unit 502 interfaces with the provision libraries 300 to provide a list of supplemental provisions corresponding to the current provision, that can be selected by the user. In the preferred embodiment, the authoring control unit 502 lists the corresponding supplemental provisions from the shared provision library 310 and from the contract-type provision library 340 or 370 that corresponds to the contract type of the new contract folder 200. Specifically, if the new contract folder 200 corresponds to the contract-type one-provision library 340, the authoring control unit 502 lists the corresponding supplemental provisions from the supplemental provisions 354 and 364. The authoring control unit 502 then prompts the user to select a supplemental provision from the list. At a process block 866, the authoring control unit 502 receives a user input selecting a supplemental provision from the displayed list.

At a process block 868, the authoring control unit 502 inserts the provision language of the selected supplemental provision immediately below the current provision. After the process block 868, the authoring control unit 502 advances to the terminal block 876.

At the process block 870, the authoring control unit 502 interfaces with the provision libraries 300 to provide a list of additional provisions corresponding to the current provision, that can be selected by the user. In the preferred embodiment, the authoring control unit 502 lists the corresponding additional provisions from the shared provision library 310 and from the contract-type provision library 340 or 370 that corresponds to the contract type of the new contract folder 200. Specifically, the authoring control unit 502 lists the corresponding additional provisions from the additional provisions 326, 336, 356, and 366 corresponding to the contract type. The authoring control unit 502 then prompts the user to select an additional provision from the list. At a process block 872, the authoring control unit 502 receives a user input selecting an additional provision from the displayed list.

At a process block 874, the authoring control unit 502 inserts the provision language of the selected additional provision immediately below the current provision. After the process block 874, the authoring control unit 502 advances to the terminal block 876. The method of FIGS. 11A and 11B ends at the terminal block 876.

Figure 12A:
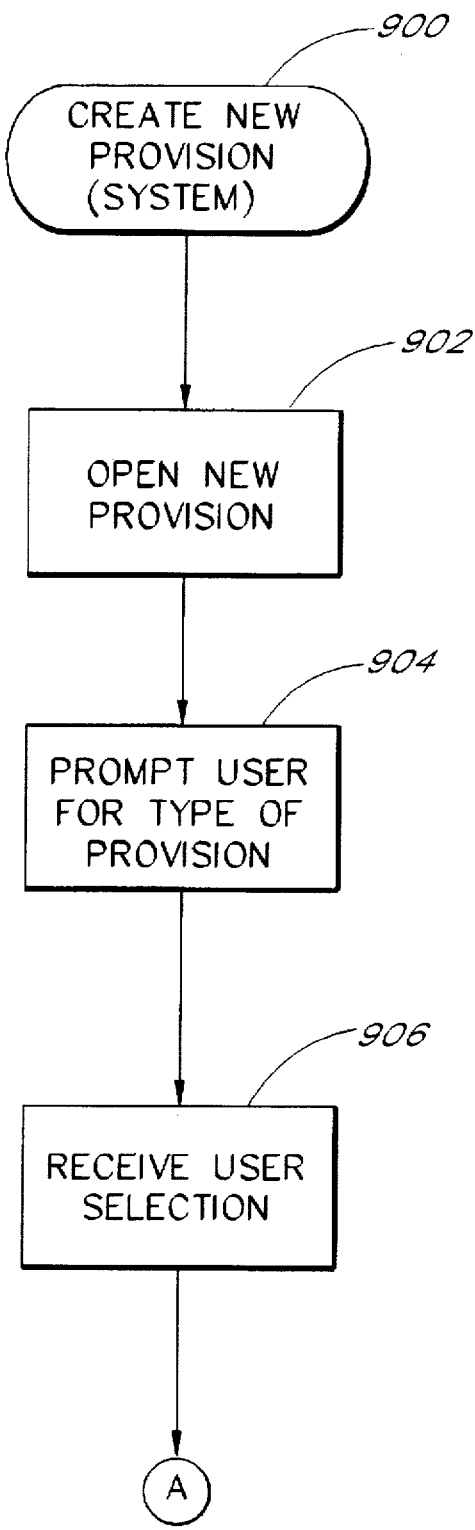
FIGS. 12A, 12B, and 12C illustrate a flowchart of a preferred method that is performed by the contract authoring unit of FIGS. 1A and 5 to allow for the creation of a new contract provision.
Figure 12B:
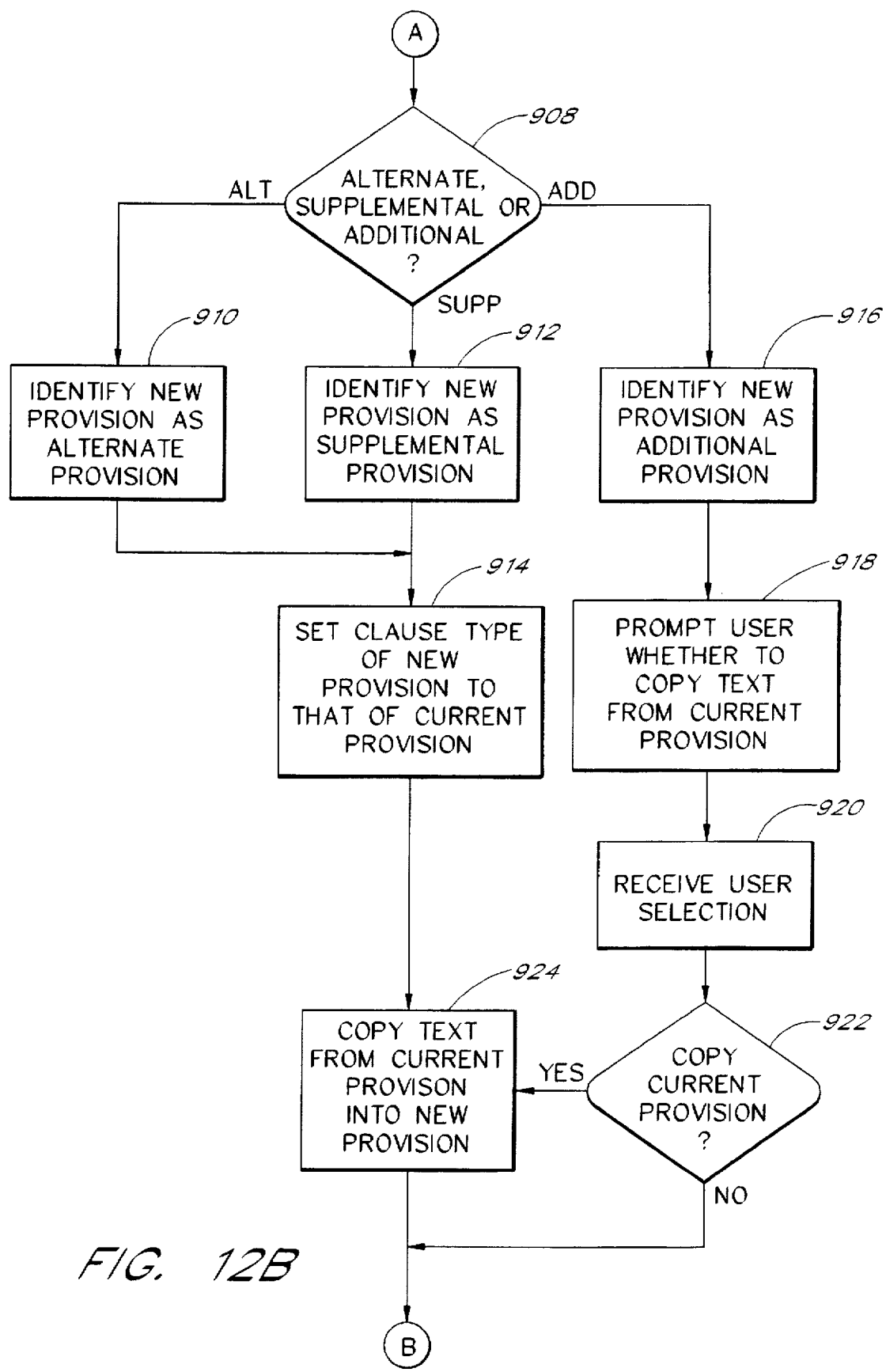
Figure 12C:
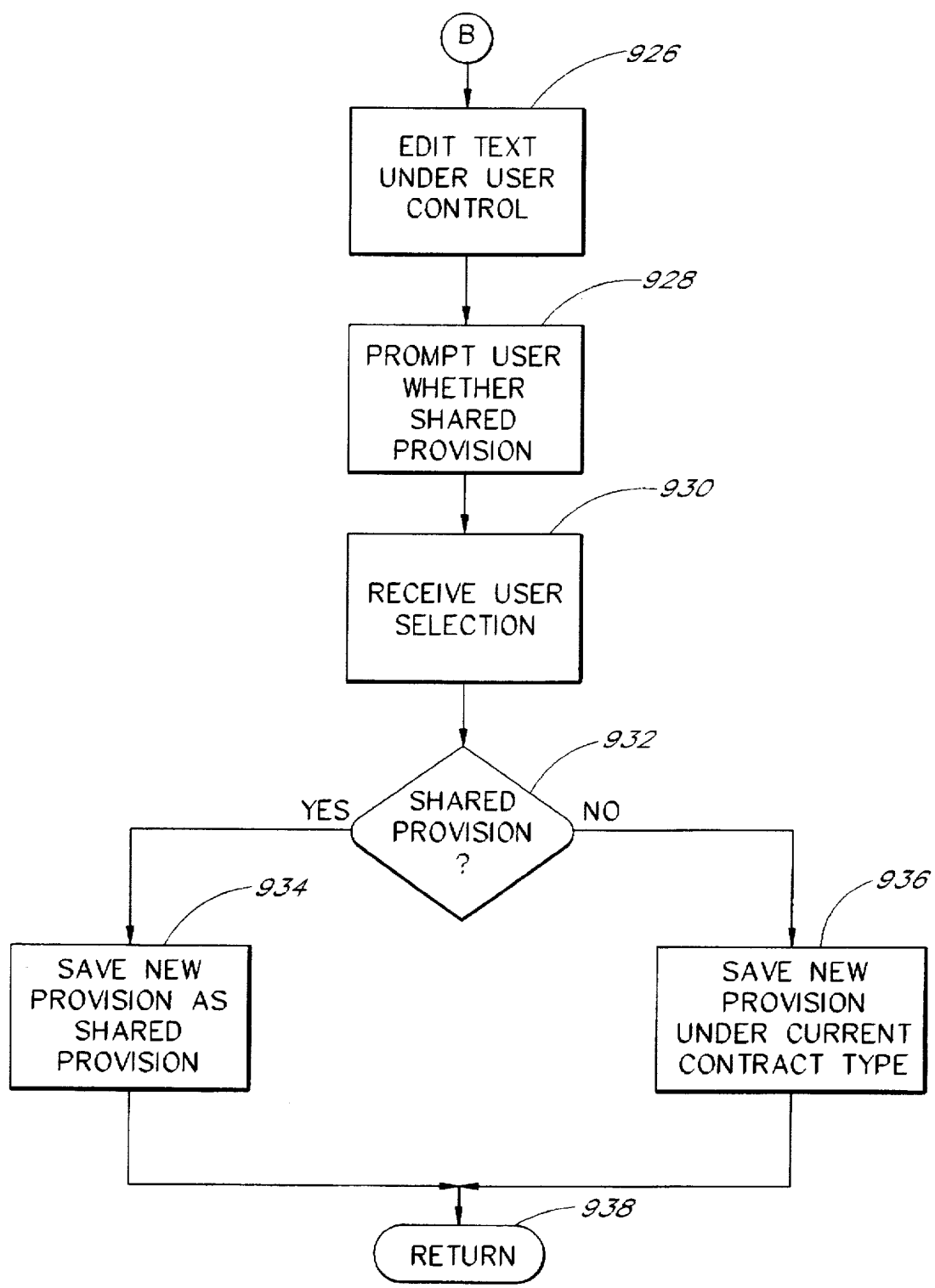

FIGS. 12A, 12B, and 12C illustrate a flowchart of a method performed by the authoring control unit 502 to allow a user to create a new contract provision. The method begins at an initial block 900, in FIG. 12A.

At a process block 902, the authoring control unit 502 allocates enough system memory for the creation of a new contract provision. At a process block 904, the authoring control unit 502 prompts the user to select a type of provision to be created. The user may indicate an alternate provision, a supplemental provision, or an additional provision. At a process block 906, the authoring control unit 502 receives a user input selecting a provision type.

At a decision block 908 (FIG. 12B), the authoring control unit 502 determines which type of provision is indicated by the user. If the user indicates an alternate provision, the authoring control unit 502 advances to a process block 910. If the user indicates a supplemental provision, the authoring control unit 502 advances to a process block 912. If the user indicates an additional provision, the authoring control unit 502 advances to a process block 916.

At the process block 910, the authoring control unit 502 identifies the new contract provision as an alternate provision. After the process block 910, the authoring control unit 502 advances to a process block 914. At the process block 912, the authoring control unit 502 identifies the new contract provision as a supplemental provision. After the process block 912, the authoring control unit 502 advances to the process block 914. At the process block 916, the authoring control unit 502 identifies the new contract provision as an additional provision. After the process block 916, the authoring control unit 502 advances to a process block 918.

At the process block 914, the authoring control unit 502 sets the clause type of the new provision to be the same as the clause type of the current provision. Each contract provision in the general provisions document 206 is identified by a clause type. The clause type of a contract provision may be any of various types of clauses that may be inserted into a contract. For example, one clause type may be a termination clause, for indicating when and under what circumstances a contract will expire. Thus, if, for example, the current provision is a termination clause, the new contract provision is identified as a termination clause in the process block 914. After the process block 914, the authoring control unit 502 advances to a process block 924. At the process block 924, the authoring control unit 502 copies the text from the current contract provision, located in system memory, to the new provision, also located in system memory. After the process block 924, the authoring control unit 502 advances to the process block 926.

At the process block 918, the authoring control unit 502 prompts the user to indicate whether to copy the text from the current contract provision into the new contract provision. At a process block 920, the authoring control unit 502 receives a user input indicating whether to copy the text from the current contract provision. At a decision block 922, the authoring control unit 502 determines whether the user has selected to have the text from the current provision copied into the new provision. If the user has selected to have the text copied, the authoring control unit 502 advances to the process block 924. Otherwise, the authoring control unit 502 advances to a process block 926 (FIG. 12C).

At the process block 926, the authoring control unit 502 couples the text editor 504 with the new contract provision, and activates the text editor 504. The text editor 504 responds to user inputs to allow the user to edit the text of the new provision. When the user terminates the text editor function, the authoring control unit 502 advances to a process block 928.

At the process block 928, the authoring control unit 502 prompts the user to indicate whether the new provision is to be a shared provision. At a process block 930, the authoring control unit 502 receives a user input indicating whether the new provision is to be shared.

At a decision block 932, the authoring control unit 502 determines whether the user indicated that the new provision is to be shared. If the provision is to be shared, the authoring control unit 502 advances to a process block 934. Otherwise, the authoring control unit 502 advances to a process block 936.

At the process block 934, the authoring control unit 502 saves the new provision with the user-defined provisions 330. If the new provision is an alternate provision, the authoring control unit 502 saves the new provision with the alternate provisions 332. If the new provision is a supplemental provision, the authoring control unit 502 saves the new provision with the supplemental provisions 334. If the new provision is an additional provision, the authoring control unit 502 saves the new provision with the additional provisions 336. After the process block 934, the authoring control unit 502 advances to a terminal block 938.

At the process block 936, the authoring control unit 502 saves the new provision in the contract-type provision library 340 or 370 corresponding to the type of contract in the new contract folder 200. For example, if the new contract folder 200 contains a contract-type corresponding to the contract-type one-provision library 340, the authoring control unit 502 saves the new provision with the user defined provisions 360. If the new provision is an alternate provision, the authoring control unit 502 saves the new provision with the alternate provisions 362. If the new provision is a supplemental provision, the authoring control unit 502 saves the new provision with the supplemental provisions 364. If the new provision is an additional provision, the authoring control unit 502 saves the new provision with the additional provisions 366. After the process block 936, the authoring control unit 502 advances to the terminal block 938. The method of FIGS. 12A, 12B, and 12C ends at the return block 938.

One file that is used in the contract generation system is a general provisions document 206. The general provisions document 206 comprises a Microsoft®Word table having a single column extending the entire width of the document. Each cell of the table contains a single authorable unit. An authorable unit typically comprises a clause of a contract. For example, an authorable unit may specify that, under a real estate leasing contract, the tenant has the right to assign the lease to another party.

One aspect of the implementation of the preferred embodiment was relatively difficult to accomplish. Specifically, when a user is authoring a contract, as illustrated in FIGS. 7 and 10, and the user selects a function while the cursor is inside a cell of the general provisions document, it was relatively difficult to accomplish the task of determining which authorable unit corresponds to the current cursor location. In the preferred embodiment, a specific bookmark is placed in, for example, the upper left corner of each cell of the table of the general provisions document corresponding to the authorable unit contained in the cell. For example, the cell containing the authorable unit described above related to assigning a lease may contain a bookmark labeled Assign. When a user selects a function for operation on the current cell, the CAS program places a temporary bookmark in the upper left corner of the current cell. The CAS program then compares the location of the temporary bookmark with the location of each of the specific bookmarks in the table. If the location of the temporary bookmark is the same as the location of a specific bookmark, the cursor is in the cell containing the authorable unit corresponding to the specific bookmark having the same location as the temporary bookmark. The CAS program then implements the selected function to operate on the authorable unit selected by the user.

For example, if the user selects the select provision language option (see process block 808 of FIG. 10), while the cursor is in the cell containing the authorable unit related to assigning a lease, the CAS program places a temporary bookmark in the cell in which the cursor is located. When the CAS program compares the location of the temporary bookmark against the locations of the specific bookmarks, the CAS program determines that the temporary bookmark is at the same location as the Assign bookmark. The CAS program then obtains information about the clause using the DLL. The CAS program then displays a list of alternate, supplemental, or additional provisions related to the authorable unit related to assigning a lease.

The contract generation system 100 of the present invention has several advantages over prior art document automation systems. For example, the contract generation system 100 provides sufficient flexibility for a wide variety of applications. A user of the contract generation system 100 typically begins working from a standard contract document 108; however, the user can replace one or more of the provisions of the new contract document with a corporate-supplied alternate provision 322, 352, or 382, or a user-defined alternate provision 332, 362, or 392. The user can also add supplemental provisions 324, 334, 354, 364, 384, or 394, or additional provisions 326, 336, 356, 366, 386, or 396 to the new contract document. The user can also edit the new contract document to further customize the agreement to the circumstances of the particular deal.

At the same time, the contract generation system 100 allows the user to utilize standard, corporate-supplied provisions. The user is typically encouraged to utilize standard provisions when possible to obtain more consistency between different agreements within the corporation, and to ensure that the user obtains a strong legal position in the agreement. The standard provisions are preferably drafted by corporate legal counsel to establish a strong legal position for the corporation.

The contract generation system 100 also provides a legal advisor 400 to assist the user in the negotiation and formation of an agreement with an opposing party. The legal advisor 400 preferably contains information that is supplied by legal counsel. The legal advisor 400 can explain legal issues to the user, warn of possible adverse consequences of deleting or changing standard provisions, and provide negotiating advice to the user.

The present invention comprises a number of concepts that are useful in automating the generation of documents. The various concepts can be combined in a number of different ways to fulfill the needs of a variety of applications. Although the invention has been described in terms of the preferred embodiment, having a preferred combination of concepts, many variations will still involve the benefits of the present invention. Various combinations of concepts are intended to be included within the appended claims.

What is claimed is:

1. A contract authoring system implemented on a computer, said contract authoring system comprising:
   a contract authoring unit, said contract authoring unit responsive to requests from a user to manage the creation of a contract document;
   a legal advisor coupled to said contract authoring unit, said legal advisor having information for display to said user in response to requests from said user, said information comprising explanations or definitions relating to provisions in the contract document;
   an auxiliary document unit coupled to said contract authoring unit, said auxiliary document unit responsive to requests from said user to create documents associated with said contract document; and
   provision libraries, said provision libraries having at least a plurality of provisions defined for said contract document.

2. The contract authoring system of claim 1, further comprising a new contract folder, said new contract folder storing said contract document during authoring.

3. The contract authoring system of claim 1, further comprising a plurality of standard contract documents stored on a computer storage media of said computer, said standard contract documents comprising at least one standard contract having a plurality of standardized provisions.

4. The contract authoring system of claim 3, further comprising a revision maintenance unit, said revision maintenance unit responsive to a request by the user to create a new revision of said contract document having general provisions to save the existing general provisions document under a revision designator and create a new general provisions document under another revision designator.

5. The contract authoring system of claim 4, further comprising a redline unit responsive to a request by the user to compare first and second contract documents and indicate the variations between the first and second contract documents.

6. The contract authoring system of claim 1, further comprising a data entry unit, said data entry unit responsive to input by the user via an input device to accept data from insertion into said contract document.

7. The contract authoring system of claim 6, further comprising a print unit, said print unit responsive to a print request from said user to print said contract document in a format selected by said user.

8. The contract authoring system of claim 7, wherein said format selection by said user comprises a format which has the appearance of a preprinted form.

9. The contract authoring system of claim 1, further comprising a E-mail control unit, said E-mail control unit responsive to requests from said user to establish an E-mail connection and forward said contract document as well as other documents to another E-mail location.

10. A contract authoring system for implementation on a computer having mass storage media and system memory, said contract authoring system comprising:

at least one standard contract document stored on said mass storage media, the at least one standard contract document comprising a plurality of standard provisions;

a new contract library stored on said mass storage media, said new contract library having a plurality of alternate, supplemental and additional provisions;

a new contract folder configured in said system memory;

a contract authoring unit, said contract authoring unit coupled to said new contract folder, said contract authoring system responsive to requests from a user to retrieve said standard contract from said mass storage media and to store said standard contract document in said new contract folder, said contract authoring unit further responsive to requests from said user to allow said user to select one or more of said alternate, supplemental or additional provisions for placement in said standard contract document in said new contract folder to form a new contract with a plurality of provisions;

a legal advisor coupled to said contract authoring unit, said legal advisor having information for display to said user, said information comprising explanations or definitions and an auxiliary document unit coupled to said contract authoring unit and to said new contract folder, said auxiliary document unit responsive to information in said new contract document to compile at least one auxiliary document related to said new contract.

11. The contract authoring system of claim 10, wherein said at least one auxiliary document comprises one or more of a contract schedule listing one or more of payment dates, termination dates, and completion dates associated with said new contract document.

12. The contract authoring system of claim 10, further comprising a redline unit responsive to a request by the user to compare first and second contract documents and indicate the variations between the first and second contract documents.

13. The contract authoring system of claim 10, further comprising a data entry unit, said data entry unit responsive to input by the user via an input device to accept data from insertion into said new contract document.

14. The contract authoring system of claim 10, further comprising a print unit, said print unit responsive to a print request from said user to print said contract document in a format selected by said user.

15. The contract authoring system of claim 14, wherein said format selection by said user comprises a format which has the appearance of a preprinted form.

16. The contract authoring system of claim 10, further comprising a E-mail control unit, said E-mail control unit responsive to requests from said user to establish an E-mail connection and forward said contract document to another E-mail location.

* * * * *